US012723952B2

(12) United States Patent
Lee

(10) Patent No.: US 12,723,952 B2

(45) Date of Patent: Sep. 1, 2026

(54) HYDROGEL-BASED STAMPING FOR SOLUTION-FREE BLOOD CELL STAINING

(71) Applicant: NOUL CO., LTD., Yongin-si (KR)

(72) Inventor: Dong Young Lee, Yongin-si (KR)

(73) Assignee: NOUL CO., LTD., Yongin-si (KR)

( * ) Notice: Subject to any disclaimer, the term of this patent is extended or adjusted under 35 U.S.C. 154(b) by 436 days.

(21) Appl. No.: 18/548,360

(22) PCT Filed: Apr. 2, 2022

(86) PCT No.: PCT/IB2022/053088

§ 371 (c)(1),
(2) Date: Aug. 30, 2023

(87) PCT Pub. No.: WO2022/208480

PCT Pub. Date: Oct. 6, 2022

(65) Prior Publication Data

US 2024/0133779 A1 Apr. 25, 2024
US 2024/0230484 A9 Jul. 11, 2024

Related U.S. Application Data

(60) Provisional application No. 63/173,876, filed on Apr. 12, 2021, provisional application No. 63/170,419, filed on Apr. 2, 2021.

(51) Int. Cl.
*G01N 1/30* (2006.01)

(52) U.S. Cl.
CPC ..................................... *G01N 1/30* (2013.01)

(58) Field of Classification Search
None
See application file for complete search history.

(56) References Cited

U.S. PATENT DOCUMENTS

2019/0316995 A1 10/2019 Lee et al.

FOREIGN PATENT DOCUMENTS

| | | | |
|---|---|---|---|
| JP | 2001-021468 | A | 1/2001 |
| KR | 10-1842829 | B1 | 3/2018 |
| WO | 2014/145984 | A1 | 9/2014 |
| WO | 2020/22265 | A1 | 11/2020 |
| WO | 2022/208480 | A1 | 10/2022 |

OTHER PUBLICATIONS

Lako & Rodig "HTAPP_Hematoxylin and Eosin (H&E) Staining Protocol of FFPE tissue" (2019), Protocols.io (Year: 2019).*

Armisen "Agar and agarose biotechnological applications" (1991), Hydrobiologia, vol. 221: 157-166. (Year: 1991).*

Hendry et al. "Assessing Tumor-infiltrating Lymphocytes in Solid Tumors: a Practical Review for Pathologist and Proposal for a Standardized Method from the International Immunology Biomarkers Working Group" (2017) Adv Anat Pathol, vol. 24: No. 5: 235-251. (Year: 2017).*

International Search Report and Written Opinion for PCT/IB2022/053088 mailed Jun. 28, 2022, all pages.

* cited by examiner

*Primary Examiner* — Teresa E Knight

(74) *Attorney, Agent, or Firm* — Kilpatrick Townsend & Stockton LLP

(57) ABSTRACT

A method of hydrogel stamping for blood sample staining. The blood sample is prepared and placed in contact with a first hydrogel stamp having a first staining dye to facilitate diffusion out of the hydrogel stamp to stain the blood sample by the first staining dye. The blood sample is removed from contact with the first hydrogel stamp and placed in contact with a second hydrogel stamp having a second staining dye to facilitate diffusion out of the hydrogel stamp to stain the blood sample by the second staining dye. The blood sample is removed from contact with the second hydrogel stamp and placed in contact with a third hydrogel stamp having a buffer substance to absorb excessive unbound or weakly-bound staining dye from the blood sample, and subsequently removed from the blood sample. No intermediate washing step is performed after staining by the first or second staining dye.

27 Claims, 25 Drawing Sheets

FIG. 5

| Manual classic rack method | Detailed description |
| --- | --- |
| 0. Pre-step: smear and dry the blood film. If not stained within 4 hours, the blood film should be fixed with methanol. | |
| 1. Fix the smear by flooding the slide with Wright-Giemsa solution for 5 minutes. | A methanol-based Wright solution is applied to the smeared cells; methanol fixes cells and facilitates adhesion of cellular proteins to the slide. |
| 2. Add 1-1.5 volumes of phosphate buffer to the Wirght-Giemsa solution for 30 second. | Buffer is added to ionize dyes and allows attachment to components of opposite charge on fixed cells. |
| 3. Mix the stain and buffer solutions on the slide by gently blowing up and down the slide several times. | |
| 4. Allow the mixture to remain on the smear for approximately 15 minutes. | |
| 5. Tip the slide vertically, and continue to wash it until the water running off the slide is colorless. | Non-specific binding is eliminated. |
| 6. Remove stain from the back of the slide and air dry. | |

Time
0 sec.
1 sec.
2 sec.
3 sec.
4 sec.
5 sec.
Image 10 s
20 s
30 s
40 s
50 s
60 s

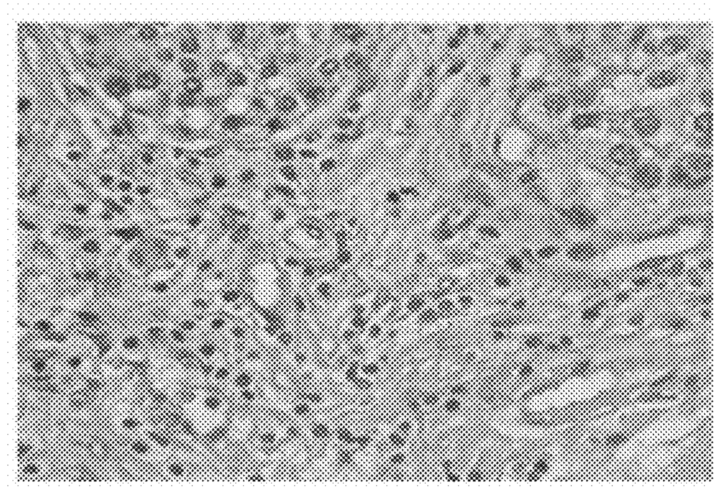
FIG. 23
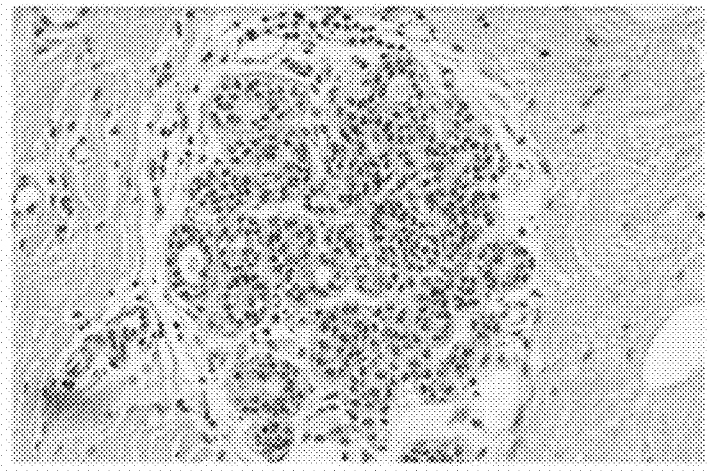

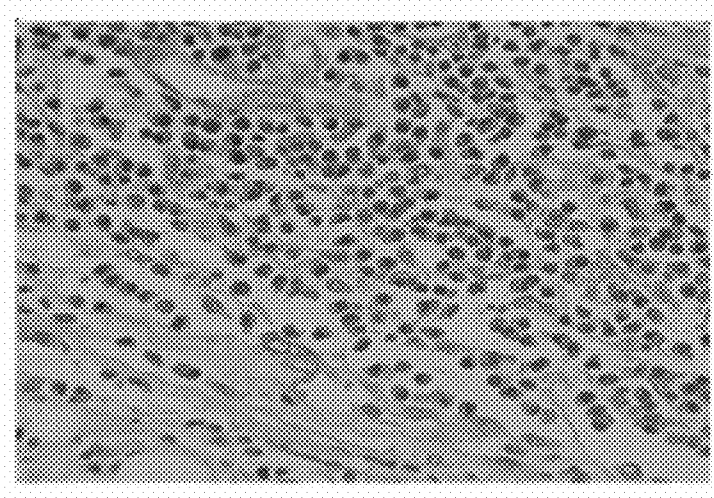
FIG. 25
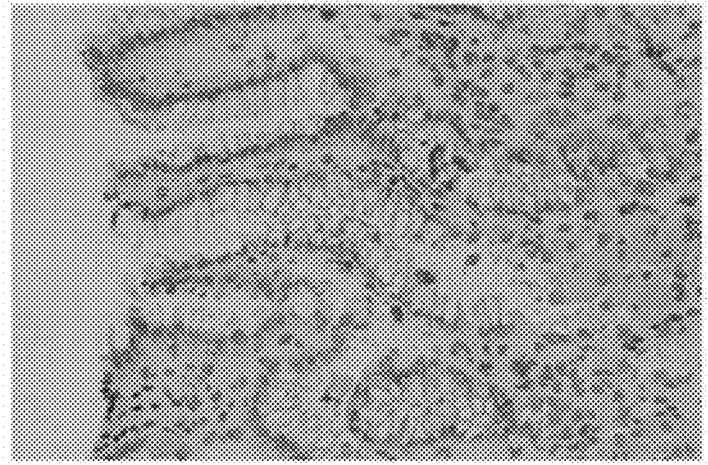

FIG. 28

| Wright-Giemsa Staining using commercial kits | Volume (mL) | Hydrogel Stamp Staining | Volume (mL) |
|---|---|---|---|
| 0. Pre-step: smear and dry the blood film. If not stained within 4 hours, the blood film should be fixed with methanol. | | 0. Pre-step: smearing and drying with methanol fixation | |
| 1. Undiluted May Grunwald stain in methanol | 15 | 1. Eosin stamp staining | 1 |
| 2. 1:10 diluted May Grunwald stain | 15 | 2. Methylene blue/Azure B stamp staining | 1 |
| 3. Rinsing with buffer | 15 | 3. Buffer Patch | 1 |
| 4. 1:25 diluted Giemsa stain | 15 | | |
| 5. Washing | 15 | | |
| Total | 75 | | 3 |

FIG. 30

| Agarose concentration(%) | | 0.5 | 1.0 | 2.0 | 3.0 | 4.0 |
|---|---|---|---|---|---|---|
| Hardness (g) | Agarose gel with dyes | 18.9±2.6 | 81.8±10.8 | 262.0±29.6 | 414.4±22.0 | 657.5±9.0 |
| | Agarose hydrogel only | 11.1±3.8 | 107.4±14.4 | 261.8±29.7 | 472.2±42.6 | 700.6±57.6 |

HYDROGEL-BASED STAMPING FOR SOLUTION-FREE BLOOD CELL STAINING

CROSS-REFERENCE TO RELATED APPLICATIONS

This application claims the benefit of priority of U.S. Provisional Application No. 63/170,419, filed Apr. 2, 2021, and U.S. Provisional Application No. 63/173,876, filed Apr. 12, 2021. The content of the foregoing applications is incorporated herein in its entirety by reference.

TECHNICAL FIELD

The subject matter described herein relates to hydrogel-based stamping for solution-free blood cell staining.

BACKGROUND

Microscopic examination of a blood smear remains a standard screening procedure in hematology. For an accurate diagnosis, it is critical to producing quality blood smears, which are often performed by an experienced and skilled person. Producing a blood smear sample of good quality for microscopic examination involves labor-intensive procedures that require specialized skills. This can be major bottleneck in low-income and middle-income countries (LMICs), which results in lower diagnostic accuracy. For example, the diagnostic accuracy of malaria by blood smear ranges from 55-80% in LMICs, while >99% of malaria cases and deaths occur in LMICs. This variability mostly comes from the quality of blood smear staining attributed to the lack of skilled technicians and the poor quality of water and reagents. The need for reliable and reproducible cell staining has led to the development of automatic cell staining instruments, enhancing laboratory capacity. Unfortunately, the deployment of these automated instruments is usually limited to a well-equipped central laboratory due to high maintenance costs and the need for large amounts of reagents and liquid waste. Therefore, there is a critical need for a simple, fast, robust, and inexpensive method to generate high-quality blood smear samples. Successful implementation of such a method would mitigate the resource-limited conditions in LMICs.

SUMMARY

This disclosure describes, among other things, novel methods of hydrogel stamping for blood sample staining. The blood sample is prepared and placed in contact with a first hydrogel stamp having a first staining dye to facilitate diffusion out of the hydrogel stamp to stain the blood sample by the first staining dye. The blood sample is removed from contact with the first hydrogel stamp and placed in contact with a second hydrogel stamp having a second staining dye to facilitate diffusion out of the hydrogel stamp to stain the blood sample by the second staining dye. The blood sample is removed from contact with the second hydrogel stamp and placed in contact with a third hydrogel stamp having a buffer substance to absorb excessive unbound or weakly-bound staining dye from the blood sample. The third hydrogel stamp is removed from the blood sample. No intermediate washing step is performed after staining by the first or second staining dye.

In some variations, the blood sample is prepared through smearing.

In other variations, the blood sample is dried with methanol fixation.

In some variations, the first staining dye includes eosin and the second staining dye includes at least one of methylene blue or Azure B.

In other variations, the first staining dye includes at least one of methylene blue or Azure B and the second staining dye includes eosin.

In some variations, each of the first, second, and third hydrogel stamps includes at least one of agarose, polyacrylamide, alginate, or polyaniline.

In other variations, each of the first, second, and third hydrogel stamps includes agarose.

In some variations, the agarose is uncharged.

In other variations, the agarose forms nanometer-scale channels.

In some variations, the blood sample is white blood cell and/or red blood cell.

In other variations, the white blood cell includes at least one of neutrophils, lymphocytes, monocytes, eosinophils, or basophils.

In some variations, the red blood cell include malaria.

In other variations, each of the first and second hydrogel stamp is in contact with the blood sample for less than one minute.

In some variations, the entire staining procedure is completed in less than four minutes.

In other variations, the first hydrogel stamp is in contact with the blood sample between about 10 seconds and about 60 seconds.

In some variations, the first hydrogel stamp is in contact with the blood sample about 30 seconds.

In other variations, the second hydrogel stamp is in contact with the blood sample between about 10 seconds and about 30 seconds.

In some variations, the second hydrogel stamp is in contact with the blood sample about 10 seconds.

In other variations, the third hydrogel stamp is in contact with the blood sample between about 30 seconds and about 180 seconds.

In some variations, the third hydrogel stamp is in contact with the blood sample about 180 seconds.

In other variations, the first hydrogel stamp is in contact with the blood sample comprising malaria for about 10 seconds and the second hydrogel stamp is in contact with the blood sample comprising malaria for about 60 seconds.

In some variation, the pH of the buffer substance is at least one of about 6.4, about 6.8, or about 7.2.

In other variations, the pH of the buffer substance is about 6.8.

In some variations, the blood sample includes a Formalin-Fixed Paraffin-Embedded (FFPE) sections.

In other variations, the FFPE sections include at least one of liver cells, breast cells, kidney cells, or colon cells.

In some variations, each of the first hydrogel stamp, the second hydrogel stamp, and the third hydrogel stamp comprise about 1 mL of a reagent.

In other variations, at least one of the staining dyes includes hematoxylin staining dye.

In some variations, at least one of the staining dyes includes Papanicolaou staining dye.

In other variations, at least one of the staining dyes includes gram staining dye.

In some variations, the concentration of the agarose is between about 0.5% and about 4.0%.

In other variations, the concentration of the agarose is between about 1.5% and about 2.5%.

In some variations, the concentration of the agarose is about 2.0%.

In other variations, the mechanical hardness of the agarose is between about 100 g and about 350 g.

In some variations, the mechanical hardness of the agarose is between about 200 g and about 300 g.

In other variations, the mechanical hardness of the agarose is about 260 g.

The subject matter described herein provides many technical advantages. For example, the hydrogel staining described herein provides a simple, reproducible, solution-free and inexpensive approach to stain blood cells. Incubation times have been improved to achieve the optimal transfer of dyes to fixed blood cells on a glass slide, with outcomes comparable to conventional solution-based methods for white blood cells and malaria-infected red blood cells. This hydrogel staining method does not require special skills to produce excellent quality stained blood film slides. The method could enhance the accuracy of microscopical examination of blood smears, especially in resource-limited settings. Additionally, the hydrogel method is a solution-less method requiring minimal to no reagents and produces less biological waste. The hydrogel used herein is biocompatible, low cost, and minimizes cell damage.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 5 is a table that defines a manual classic rack method and detailed description for Wright-Giemsa staining.

As illustrated in FIG. 6B.

FIG. 22 illustrates H&E by agarose hydrogel staining by agarose hydrogel staining on liver FFPE sections.

FIG. 23 illustrates H&E by agarose hydrogel staining by agarose hydrogel staining on breast FFPE sections.

FIG. 24 illustrates H&E by agarose hydrogel staining by agarose hydrogel staining on kidney FFPE sections.

FIG. 25 illustrates H&E by agarose hydrogel staining by agarose hydrogel staining on colon FFPE sections.

FIG. 28 is a table comparing staining protocols and reagent use (per test) for hydrogel staining and a commercial Wright-Giemsa staining kit.

FIG. 30 is a table illustrating hydrogel hardnesses measured with and without dyes with various agarose concentrations.

Like reference symbols in the various drawings indicate like elements.

DETAILED DESCRIPTION

An accurate microscopical analysis of blood smears can require a reproducible and convenient method of staining. Solution-based staining procedures can be cumbersome. Especially in low-income and middle-income countries, the lack of skilled technicians and adequate lab facilities, as well as insufficient water and reagent quality, often become confounding factors. The cell staining method described herein is based on sequential stamping of agarose gel patches that contain eosin, methylene blue/oxidized methylene blue Azure B, and buffer, respectively.

In this method, dye-containing hydrogels are sequentially placed in contact with a blood film for less than a minute to stain blood cells. After staining, a buffer hydrogel patch removes any unbound reagents. The entire staining procedure can be completed in less than 4 minutes and produces blood smear samples comparable in quality to those prepared by a high-end automated instrument. The hydrogel staining described herein can be used, for example, to detect malaria parasites in blood samples from Africa.

Figure 1:
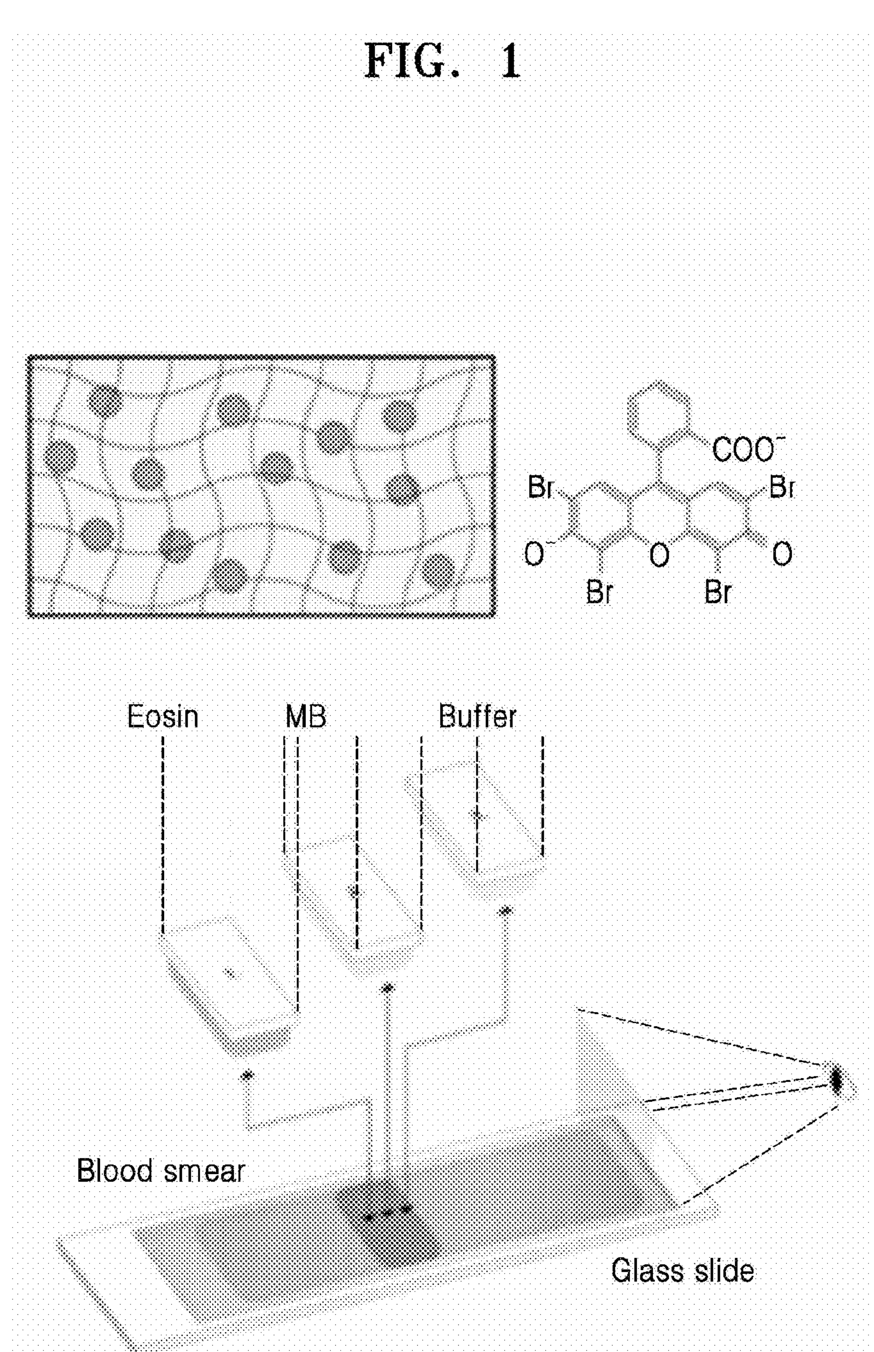
FIG. 1 illustrates a schematic of the 3-step hydrogel-based solid staining for Wright-Giemsa staining of blood smear on a glass slide.

FIGS. 1 and 4A-4I illustrate a 3-step hydrogel-based Wright-Giemsa staining of a blood smear. More specifically, FIG. 1 illustrates a schematic of the 3-step hydrogel-based solid staining for Wright-Giemsa staining of blood smear on a glass slide. Wright-Giemsa staining is a Romanowsky-type blood film stain. Methylene blue (MB) with oxidized methylene blue/Azure B is placed on the blood smear. A chemical structure of eosin Y disodium salt is shown on the top. The color criteria for the staining quality include pink for the red cells (not yellow or red) (see FIGS. 4A, 4D, and 4G), purple for the nuclei of leukocytes, and tan for the cytoplasmic neutrophilic granules. In some variations, uncharged agarose is used for the hydrogel stamp. This is because, upon gelation, uncharged agarose forms nanometer-scale channels without any further modification. Furthermore, uncharged agarose provides an attractive environment for staining dyes retained mainly by hydrogen bonding without any attendant swelling or shrinkage in aqueous buffers. In addition, agarose can adsorb and desorb dyes more efficiently than gelatin, alginate, and polyaniline composites.

Figures 2A, 2B, 2C:
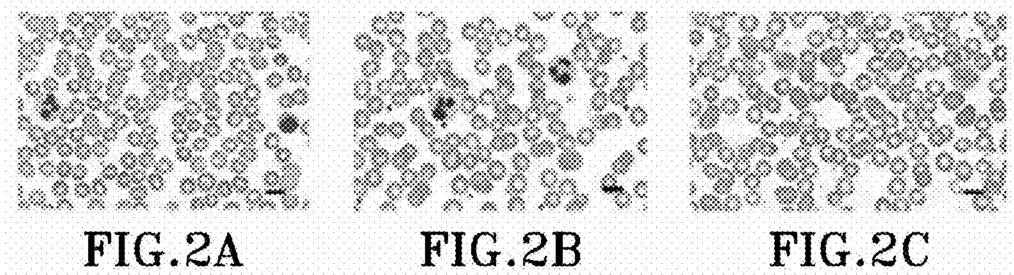
FIG. 2A is an image of agarose hydrogel staining.
FIG. 2B is an image of approximately 6% polyacrylamide hydrogel staining.
FIG. 2C is an image of alginate hydrogel staining within approximately equals amounts of sodium alginate and calcium-alginate in deionized water there were mixed to make the hydrogel stamp.

FIGS. 2A-2C illustrate a series of images of various hydrogel materials. Each of these images in FIGS. 2A-2C have a scale bar of approximately 10 μm. FIG. 2A is an image of agarose hydrogel staining. FIG. 2B is an image of approximately 6% polyacrylamide hydrogel staining. FIG. 2C is an image of alginate hydrogel staining within approximately equals amounts of sodium alginate and calcium-alginate in deionized water there were mixed to make the hydrogel stamp (e.g., 2% of sodium alginate and 2% calcium-alginate). Various factors contribute to obtaining staining quality and reproducibility of hydrogel-based staining. These factors include, for example, the hydrogel material, concentration, and/or mechanical properties.

As illustrated in FIGS. 2A-2C, the alginate hydrogel in FIG. 2C showed less methylene blue staining of a nucleus than the agarose gel in FIG. 2A did. The charged polyacrylamide hydrogels in FIG. 2B could be used for staining as it shows the similar staining quality as agarose hydrogel in FIG. 2A. The hydrogels in FIGS. 2A-2C were made by mixing and curing agarose powders in the presence of the staining dyes. The staining dyes can be, for example, methylene blue/Azure B staining, solution-based staining dyes such as Papanicolaou staining dye, and/or gram staining. Comparing FIGS. 2A-2C, the alginate hydrogel in FIG. 2C did not necessarily result in nucleus staining using the methylene blue, while the polyacrylamide hydrogel in FIG. 2B showed quality blood cell staining comparable to that of agarose in FIG. 2A. The agarose hydrogel of FIG. 2A has approximately 10-times lower material costs and better feasibility for mass production over the polyacrylamide hydrogel in FIG. 2B.

Figures 3A, 3B, 3C:
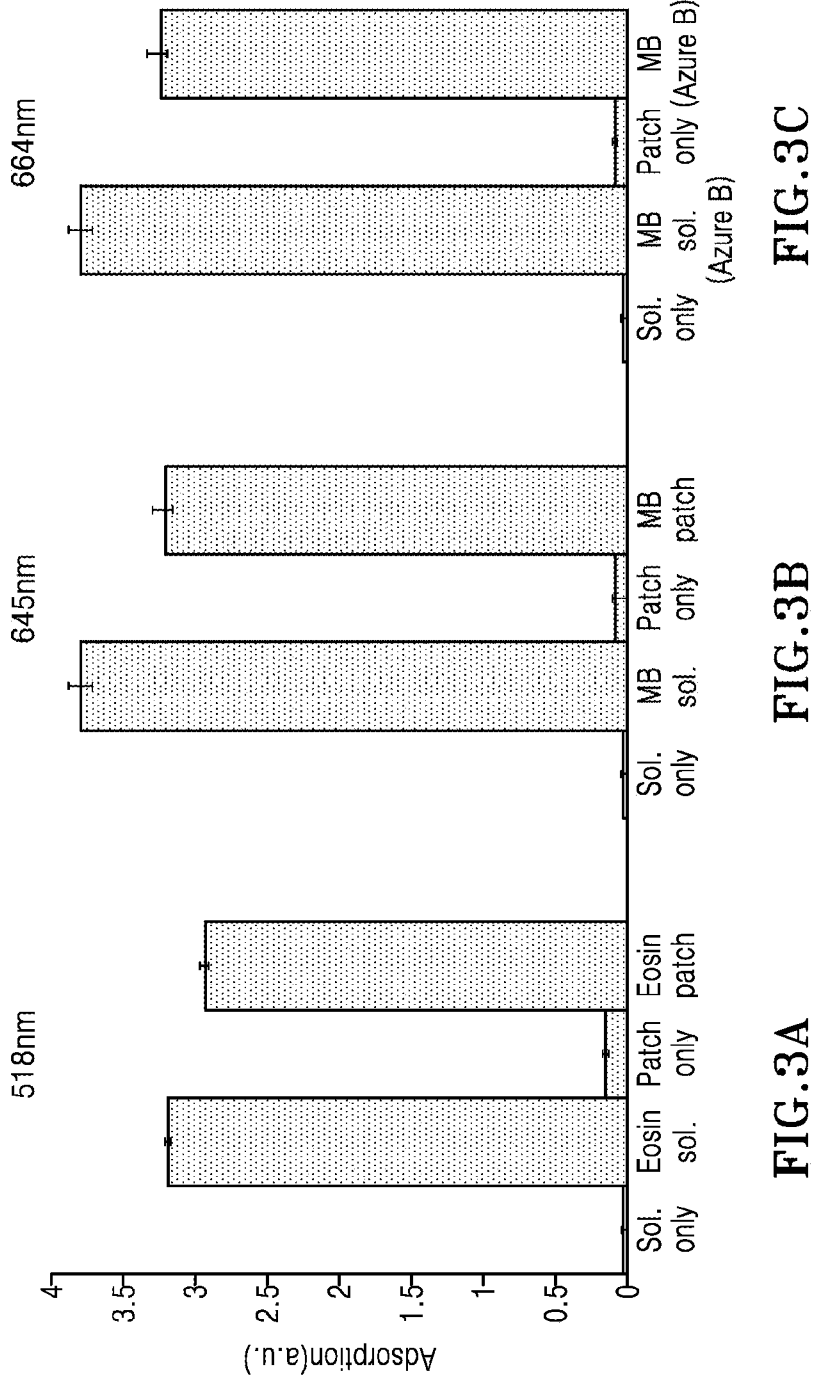
FIG. 3A is a graphical representation that illustrates a wavelength of approximately 518 nm, which shows Eosin adsorption.
FIG. 3B is a graphical representation that illustrates a wavelength of approximately 645 nm, which shows methylene blue adsorption.
FIG. 3C is a graphical representation that illustrates a wavelength of approximately 664 nm, which shows Azure B adsorption.

FIGS. 3A-3C illustrates a series of graphical representations of the mean adsorption of solutions and hydrogels at various wavelengths for both eosin-containing and MB/Azure B-containing solutions and hydrogels. The solutions used for FIGS. 3A-3C includes the same compounds as the hydrogel patch, just not solidified. FIG. 3A is a graphical representation that illustrates a wavelength of approximately 518 nm, which shows Eosin adsorption. FIG. 3B is a graphical representation that illustrates a wavelength of approximately 645 nm, which shows methylene blue adsorption. FIG. 3C is a graphical representation that illustrates a wavelength of approximately 664 nm, which shows Azure B adsorption.

Figures 4A, 4B, 4C, 4D, 4E, 4F, 4G, 4H, 4I:
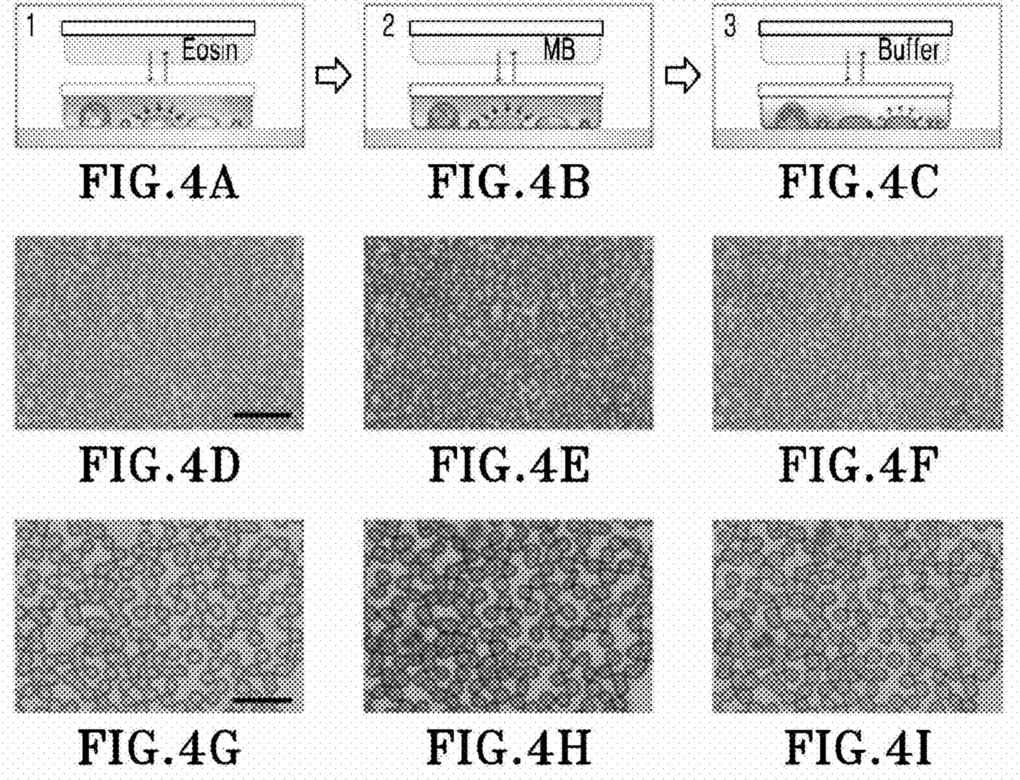
FIG. 4A illustrates a gel that contains anionic acidic eosin dyes.
FIG. 4B illustrates a gel that contains cationic methylene blue with oxidized methylene blue/Azure B.
FIG. 4C illustrates a gel that contains a buffer solution to remove non-specifically bound dyes and replaces the extensive washing steps.
FIG. 4D is a representative image after eosin stamping with a scale bar of approximately 80 μm.
FIG. 4E is a representative image after MB stamping with a scale bar of approximately 80 μm.
FIG. 4F is a representative image after buffer stamping with a scale bar of approximately 80 μm.
FIG. 4G is a representative image after eosin stamping with a scale bar of approximately 20 μm.
FIG. 4H is a representative image after MB stamping with a scale bar of approximately 20 μm.
FIG. 4I is a representative image after buffer stamping with a scale bar of approximately 20 μm.

FIGS. 4A-4I illustrate a series of representative images of blood cells after hydrogel stamping. Direct contact of the agarose hydrogel with the blood smear results in the transfer of dyes onto blood cells and stains them. FIG. 4A illustrates a gel that contains anionic acidic eosin dyes. FIG. 4B illustrates a gel that contains cationic methylene blue with oxidized methylene blue/Azure B. Acidic eosin dyes bind to basic cellular components (e.g., proteins) and stain erythrocytes and eosinophil granules pink as shown in FIGS. 4D, 4G. Methylene blue/Azure B bind to more acidic cellular components (e.g., chromatin) and stains leukocyte nuclei, cell granules, and lymphocyte cytoplasm blue as shown in images FIGS. 4E, 4H. FIG. 4C illustrates a gel that contains a buffer solution to remove non-specifically bound dyes and replaces the extensive washing steps as defined in the table shown in FIG. 5: hydrophilic agarose hydrogel has already been used as absorbents for methylene blue dyes. FIG. 4D is a representative image after eosin stamping with a scale bar of approximately 80 μm. FIG. 4E is a representative image after MB stamping with a scale bar of approximately 80 μm. FIG. 4F is a representative image after buffer stamping with a scale bar of approximately 80 μm. FIG. 4G is a representative image after eosin stamping with a scale bar of approximately 20 μm. FIG. 4H is a representative image after MB stamping with a scale bar of approximately 20 μm. FIG. 4I is a representative image after buffer stamping with a scale bar of approximately 20 μm.

FIG. 5 is a table that defines a manual classic rack method and detailed description for Wright-Giemsa staining. Hydrophilic agarose hydrogel also adjusts the color tone of the stains.

Figures 6A, 6B, 7A, 7B:
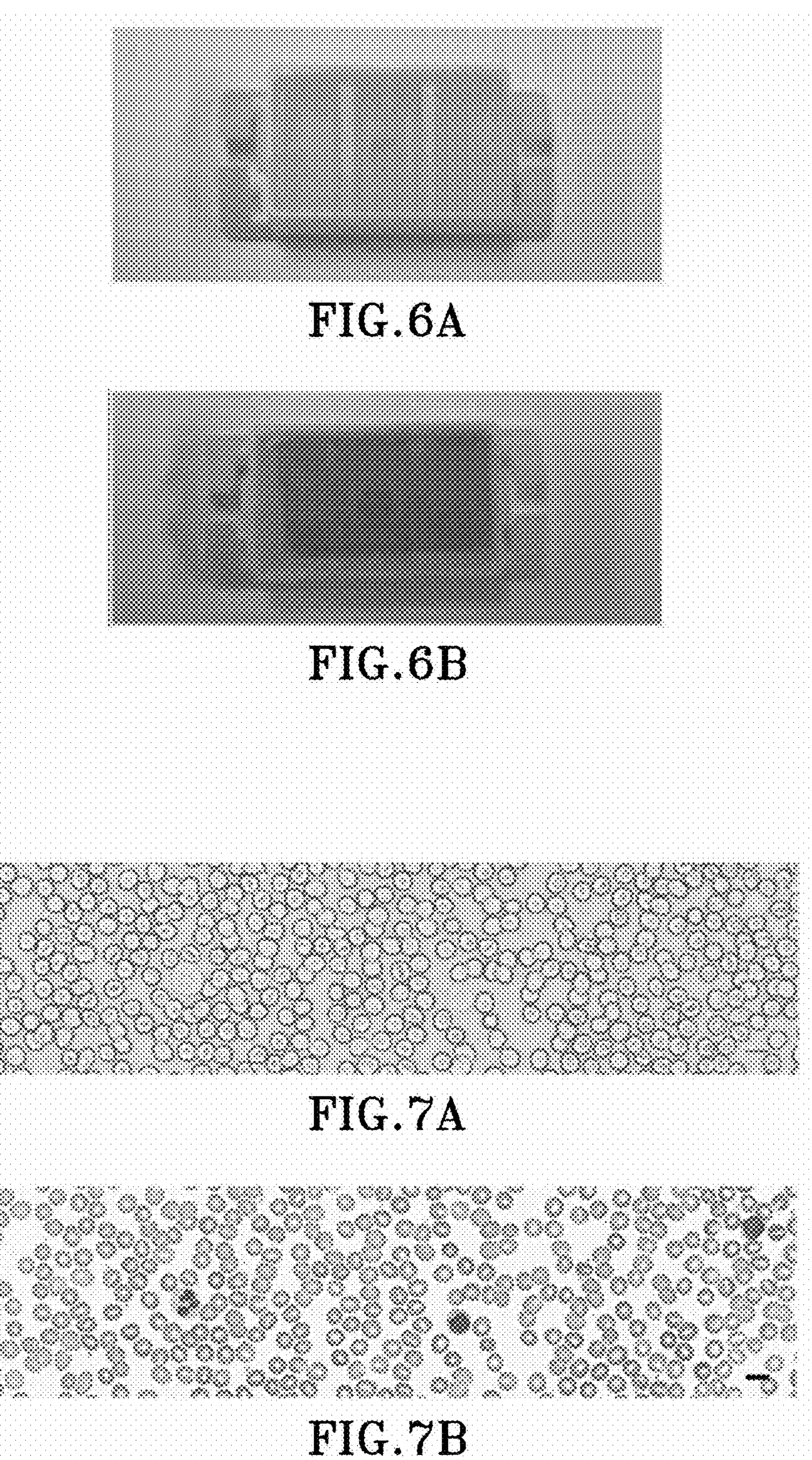
FIG. 6A is a photograph of a buffer patch before the hydrogel stamping.
FIG. 6B is a photograph of a buffer patch after hydrogel stamping.
FIG. 7A is an image illustrating morphology before the hydrogel staining method.
FIG. 7B is an image after the hydrogel staining method.

FIGS. 6A-6B are photographs of a buffer patch both before and after hydrogel stamping. FIG. 6A is a photograph of a buffer patch before the hydrogel stamping. Prior to the hydrogel stamping, at a wavelength of 514 nm, the adsorption of Eosin is approximately 0.091. At a wavelength of 645 nm, the adsorption of methylene blue is approximately 0.061. At a wavelength of 664 m, the adsorption of Azure B is approximately 0.058. The removal of unbound dyes is illustrated in FIGS. 6A-6B based on the color changes of the buffer gel and the increase in adsorption peaks at approximately 514 nm, 645 nm, and 664 nm.

FIG. 6B is a photograph of a buffer patch after hydrogel stamping. As illustrated in FIG. 6B. In FIG. 6B, the existence of the absorbed dyes in the buffer patch is shown by the purple color. After the hydrogel stamping, at a wavelength of 514 nm, the adsorption of eosin is approximately 0.235. At a wavelength of 645 nm, the adsorption of methylene blue is approximately 0.195. At a wavelength of 6645 nm, the adsorption of Azure B is approximately 0.176. The increase of the absorbance at the wavelengths for eosin, methylene blue, and Azure B dyes after stamping demonstrates the absorbance of dyes by buffer patches.

FIGS. 7A-7B illustrate images of morphology both before and after the hydrogel staining method. The scale bar for both images in FIGS. 7A-7B is approximately 10 μm. More specifically, FIG. 7A is an image illustrating morphology before the hydrogel staining method. FIG. 7B is an image after the hydrogel staining method. As illustrated in FIG. 7B, the hydrogel staining method do not affect the morphology or attachment of cells.

Figure 8:
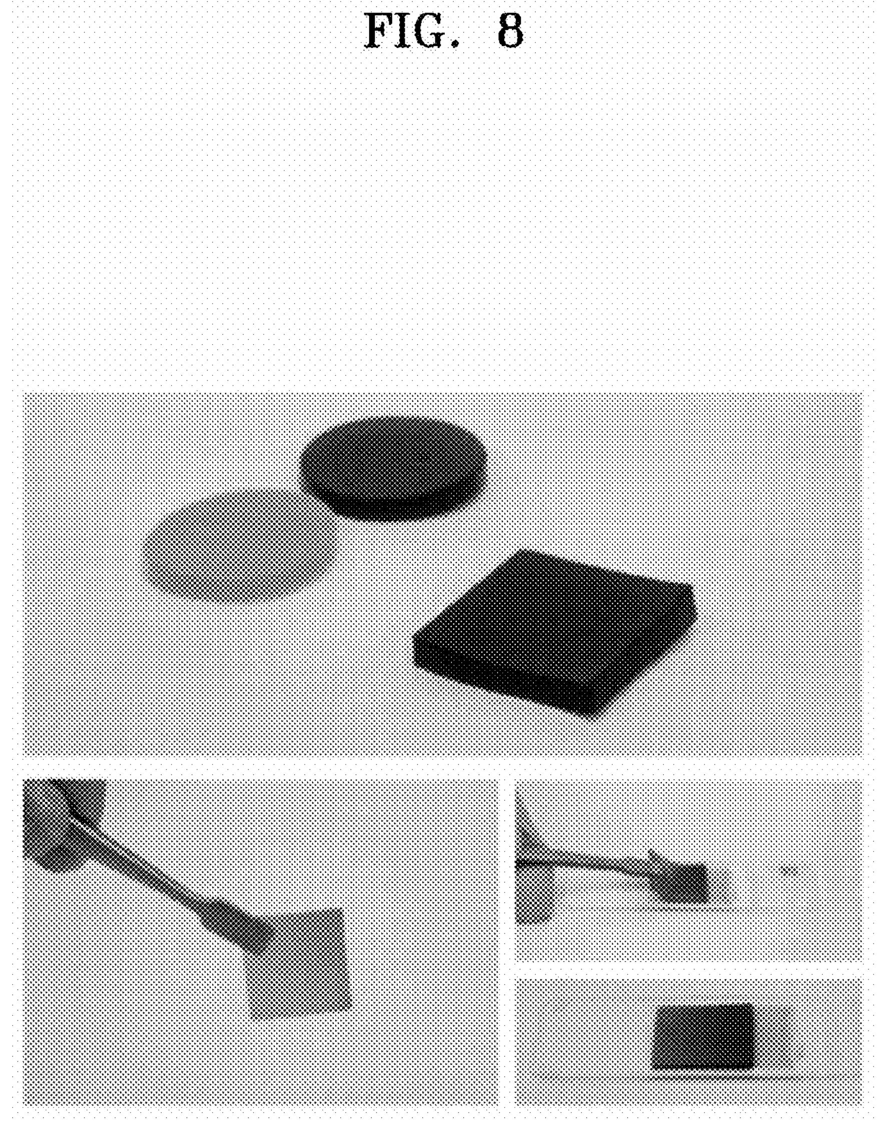
FIG. 8 illustrates a series of photographs showing various sizes and shapes of hydrogel stamps.

FIG. 8 illustrates a series of photographs showing various sizes and shapes of hydrogel stamps. For example, the hydrogel stamps can be circular, square, and/or rectangular in shape. The hydrogel stamps illustrated in FIG. 8 contain approximately 2% agarose concentration (e.g., 0.5%, 1%, 2%, 3%, and 4% agarose concentration). It is recognized that any level of agarose concentration can be formed into the various shapes of hydrogel stamps. The gel concentration determines the hydrogel's hardness. At low agarose concentrations below approximately 1%, the hydrogel is soft and can be easily broken in handling. Although there are no morphological changes nor detachment of cells using a concentration of approximately 2% agarose hydrogels, harder hydrogels may damage cells during stamping.

Figures 9, 10:
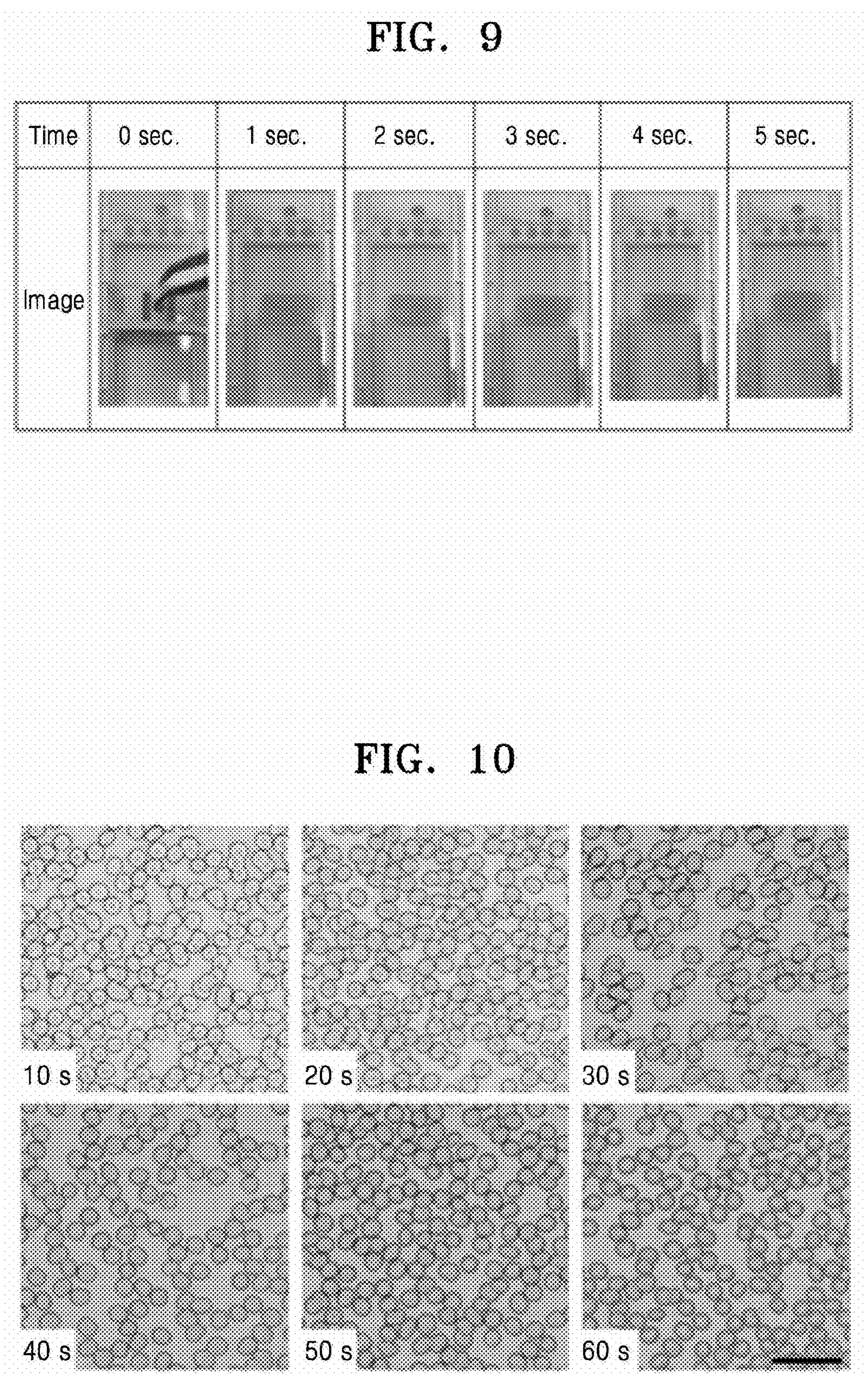
FIG. 9 is a series of images over time showing a fast-drying surface of the blood smeared film after detaching the hydrogel stamp.
FIG. 10 illustrates blood cells stained with eosin hydrogels for various staining times (e.g., 10 seconds, 20 seconds, 30 seconds, 40 seconds, 50 seconds, 60 seconds).
Figures 11A, 11B:
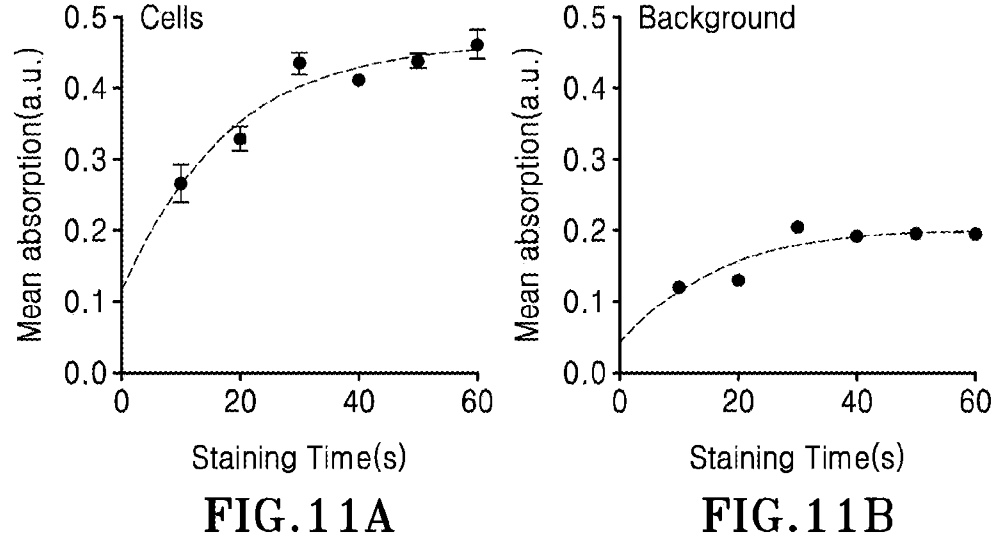
FIG. 11A is a graphical representation characterizing the mean adsorption of red blood cells as a function of staining time.
FIG. 11B is a graphical representation characterizing the mean adsorption of background as a function of staining time.

FIG. 9 is a series of images over time showing a fast-drying surface of the blood smeared film after detaching the hydrogel stamp. Once the hydrogel is detached after the staining, most of the stained surface is dried within approximately 4 seconds without any blowing. The images in FIG. 9 were taken approximately every second. The drying means very low numbers of water molecules involve as carriers and do not form a macroscale water-layer interface between the hydrogel patch and the smeared blood film.

FIGS. 10-14 characterize the hydrogel-based Wright-Giemsa staining using eosin-containing and methylene blue/Azure B-containing hydrogels for different times. More specifically, FIG. 10 illustrates blood cells stained with eosin hydrogels for various staining times (e.g., 10 seconds, 20 seconds, 30 seconds, 40 seconds, 50 seconds, 60 seconds). The scale bar in FIG. 10 is approximately 20 μm. FIG. 11A is a graphical representation characterizing the mean adsorption of red blood cells as a function of staining time. FIG. 11B is a graphical representation characterizing the mean adsorption of background as a function of staining time. Based on the graphical representations in FIGS. 11A-11B, optimal staining is observed at approximately 30 seconds of staining. FIGS. 12A-12C illustrates blood cells stained with methylene blue/Azure B hydrogels for various staining times (e.g., 10 seconds, 20 seconds, 30 seconds). More specifically, FIG. 12A illustrates blood cells stained with methylene blue/Azure B hydrogels for approximately 10 seconds. FIG. 12B illustrates blood cells stained with methylene blue/Azure B hydrogels for approximately 20 seconds. FIG. 12C illustrates blood cells stained with methylene blue/Azure B hydrogels for approximately 30 seconds. The optimal staining time is approximately 10 seconds. The scale bar is approximately 20 μm.

Figures 12A, 12B, 12C, 13A, 13B, 13C:
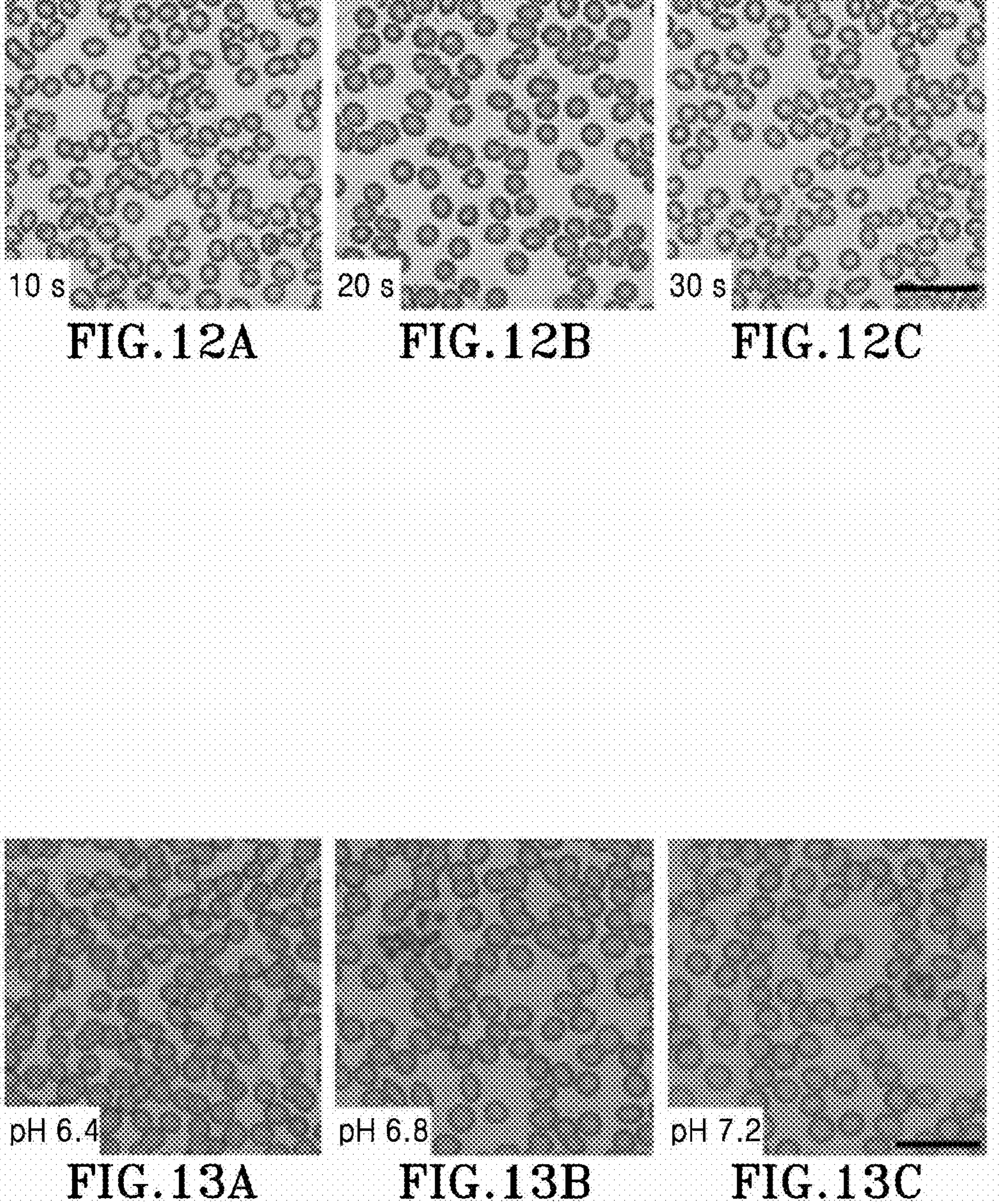
FIG. 12A illustrates blood cells stained with methylene blue/Azure B hydrogels for approximately 10 seconds.
FIG. 12B illustrates blood cells stained with methylene blue/Azure B hydrogels for approximately 20 seconds.
FIG. 12C illustrates blood cells stained with methylene blue/Azure B hydrogels for approximately 30 seconds.
FIG. 13A is an image illustrating blood cells washed at a 6.4 pH value of buffer hydrogels.
FIG. 13B is an image illustrating blood cells washed at a 6.8 pH value of buffer hydrogels.
FIG. 13C is an image illustrating blood cells washed at a 7.2 pH value of buffer hydrogels.
Figure 14:
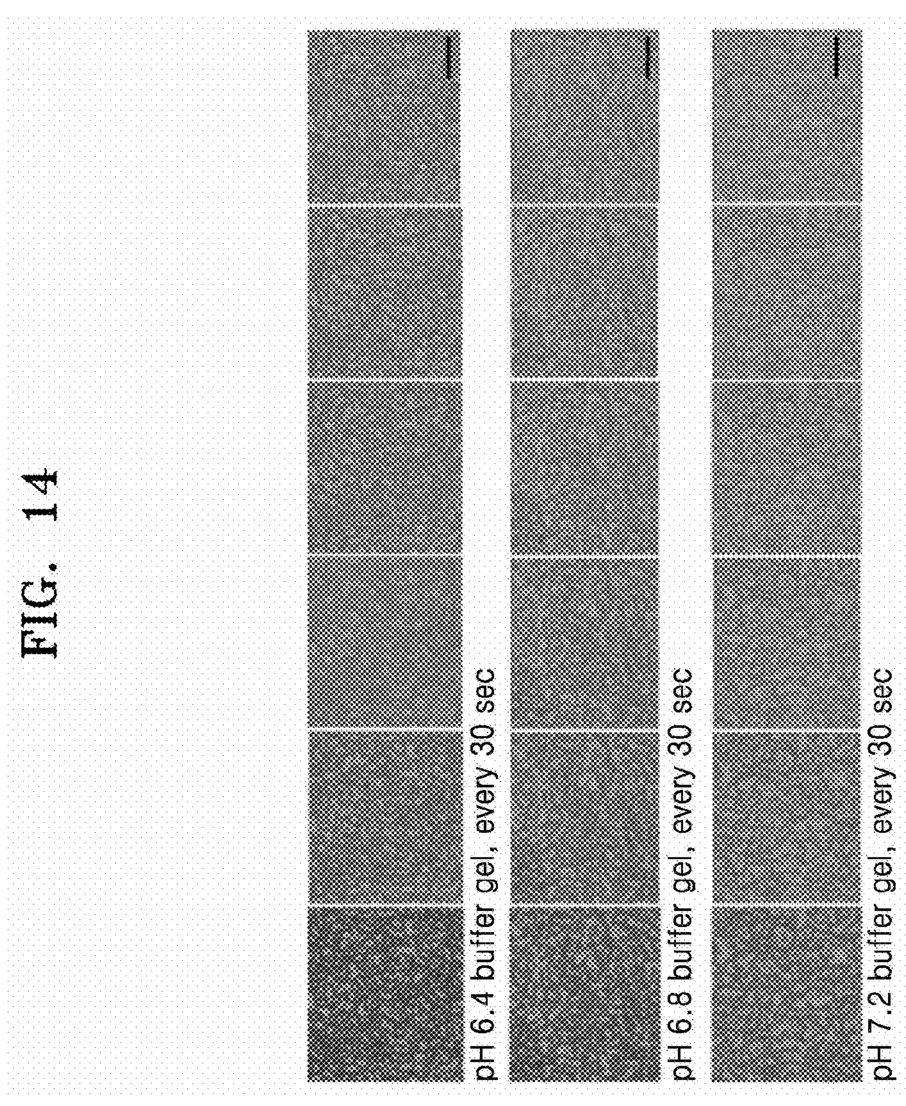
FIG. 14 is a series of representative images after the buffer hydrogel adsorption with various pH values (e.g., 6.4, 6.8, 7.2) and at a temporal resolution of approximately 30 seconds, from 30 seconds to 180 seconds.

FIGS. 13A-13C is a series of images illustrating blood cells washed at various pH values (e.g., 6.4, 6.8, 7.2) of buffer hydrogels. FIG. 13A is an image illustrating blood cells washed at a 6.4 pH value of buffer hydrogels. FIG. 13B is an image illustrating blood cells washed at a 6.8 pH value of buffer hydrogels. FIG. 13C is an image illustrating blood cells washed at a 7.2 pH value of buffer hydrogels. The scale bar of FIGS. 13A-13C is approximately 20 μm. FIG. 14 is a series of representative images after the buffer hydrogel adsorption with various pH values (e.g., 6.4, 6.8, 7.2) and at a temporal resolution of approximately 30 seconds, from 30 seconds to 180 seconds. The scale bar is approximately 80 μm.

Figures 15A, 15B:
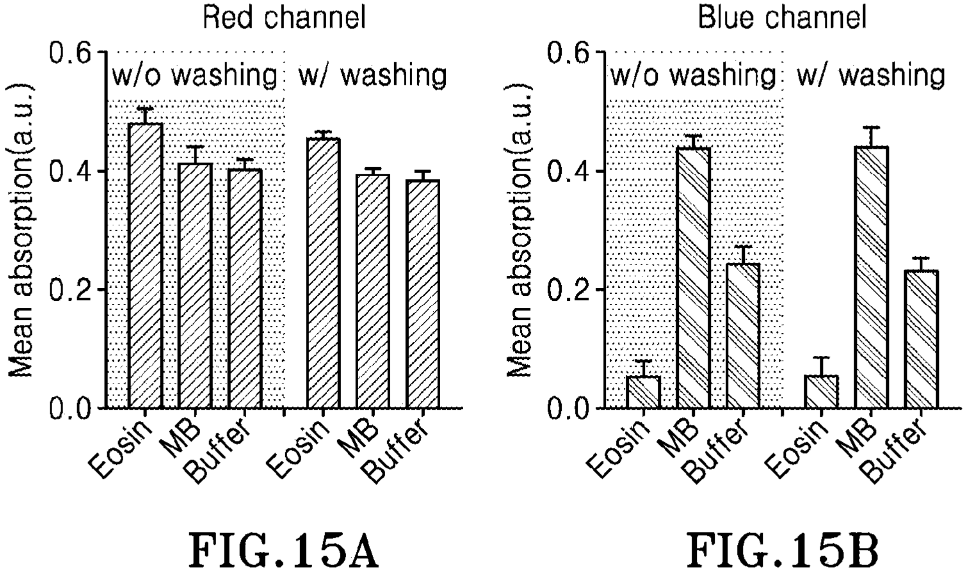
FIG. 15A is a graphical representation characterizing the mean adsorption of red blood cells in red channels.
FIG. 15B is a graphical representation characterizing the mean adsorption of red blood cells in blue channels.

FIGS. 15A-15B is a series of graphical representations characterizing the mean adsorption of red blood cells in red channels and in blue channels at each stamping step with and without intermediate washing steps after staining. FIG. 15A is a graphical representation characterizing the mean adsorption of red blood cells in red channels. FIG. 15B is a graphical representation characterizing the mean adsorption of red blood cells in blue channels. As illustrated in FIGS. 15A-15B, no significant different is observed with or without washing.

Figures 16, 17:
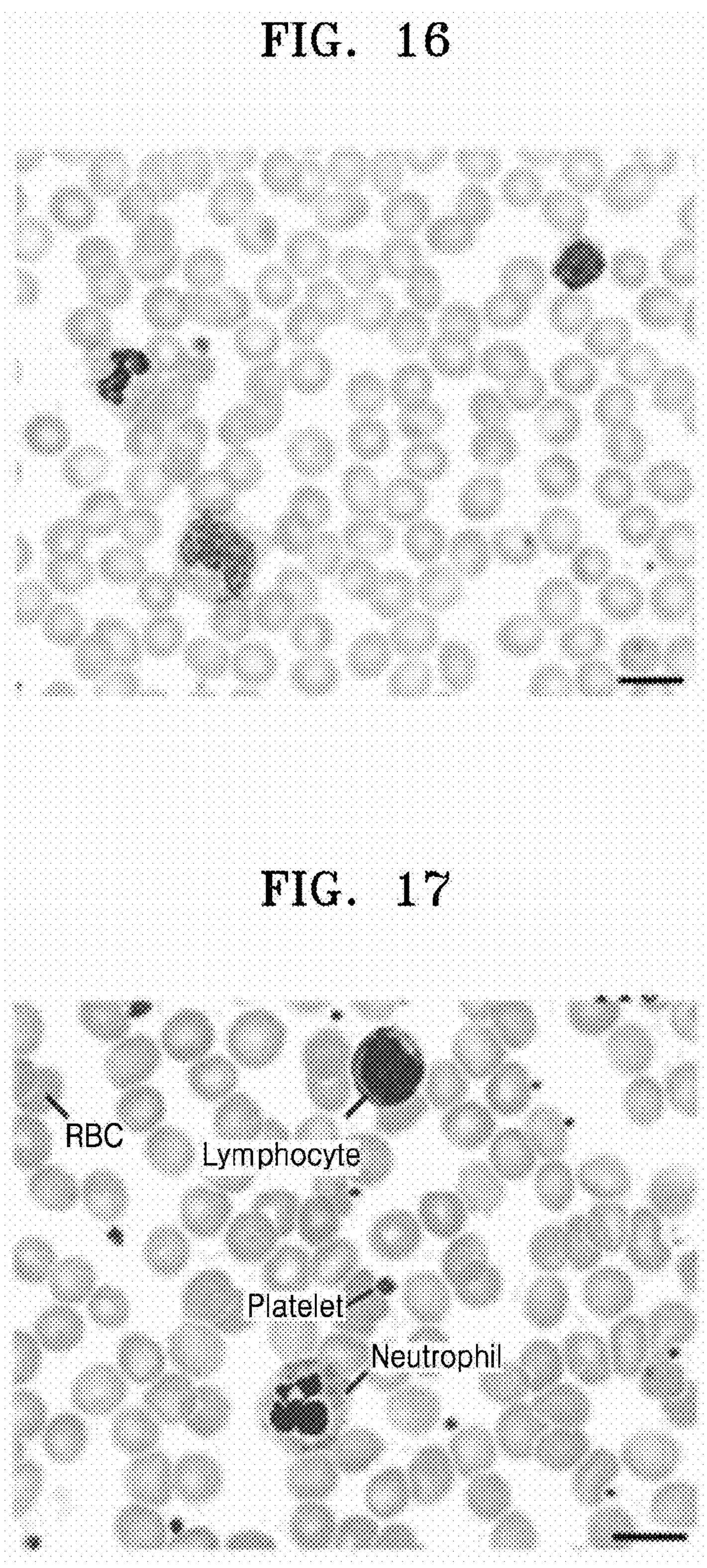
FIG. 16 is an image from a manual Wright-Giemsa staining.
FIG. 17 is an image from hydrogel staining.

FIGS. 16-17 are representative images of stained blood cells. The scale bars in these images are approximately 10 nm. More specifically, FIG. 16 is an image from a manual Wright-Giemsa staining. FIG. 17 is an image from hydrogel staining. Based on FIGS. 13 and 16-17, approximately 180 seconds of contact with a pH 6.8 buffer patch is optimal. The evaluation criteria to determine the optimal pH includes the pinkish color in red blood cells stained by eosin dye and the purpose color and contrast for nuclei of leukocytes stained by methylene blue/Azure B.

Figures 18A, 18B, 18C, 18D, 18E:
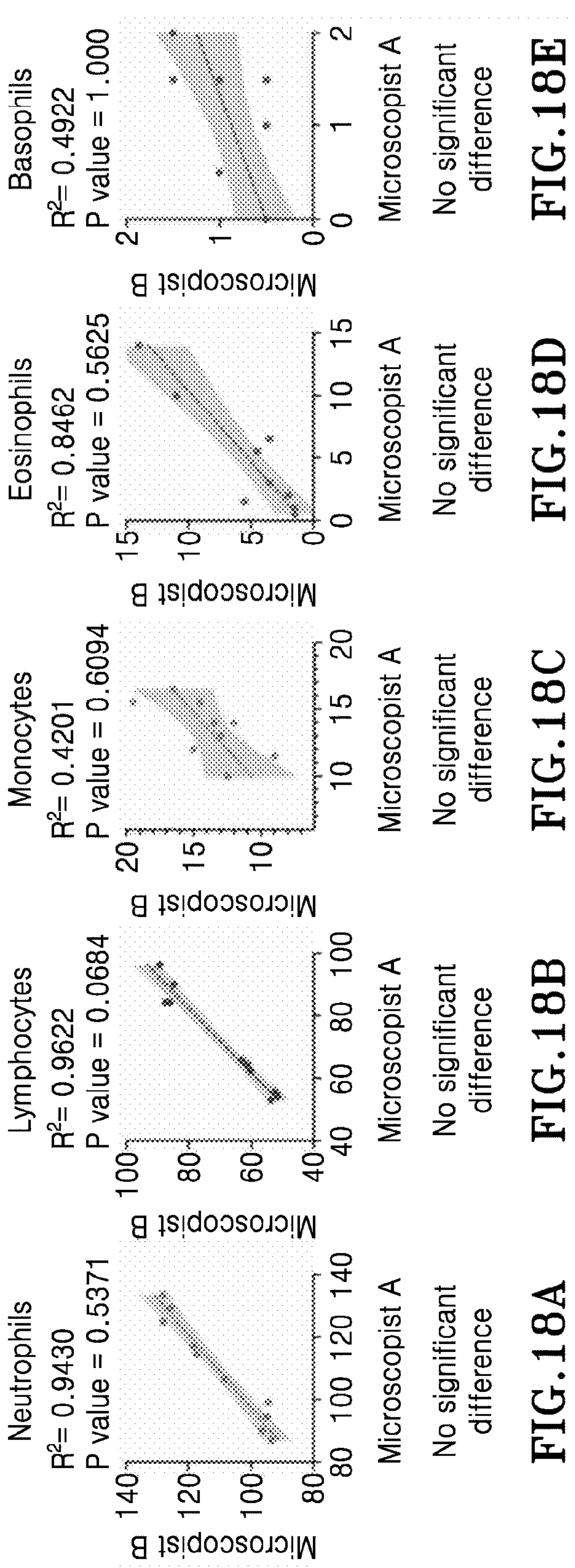
FIG. 18A illustrates a graphical representation characterizing a sample containing neutrophils stained with hydrogel stamping.
FIG. 18B illustrates a graphical representation characterizing a sample containing lymphocytes with hydrogel stamping.
FIG. 18C illustrates a graphical representation characterizing a sample containing monocytes with hydrogel stamping.
FIG. 18D illustrates a graphical representation characterizing a sample containing eosinophils with hydrogel stamping.
FIG. 18E illustrates a graphical representation characterizing a sample containing basophils with hydrogel stamping.
Figures 19A, 19B, 19C, 19D, 19E:
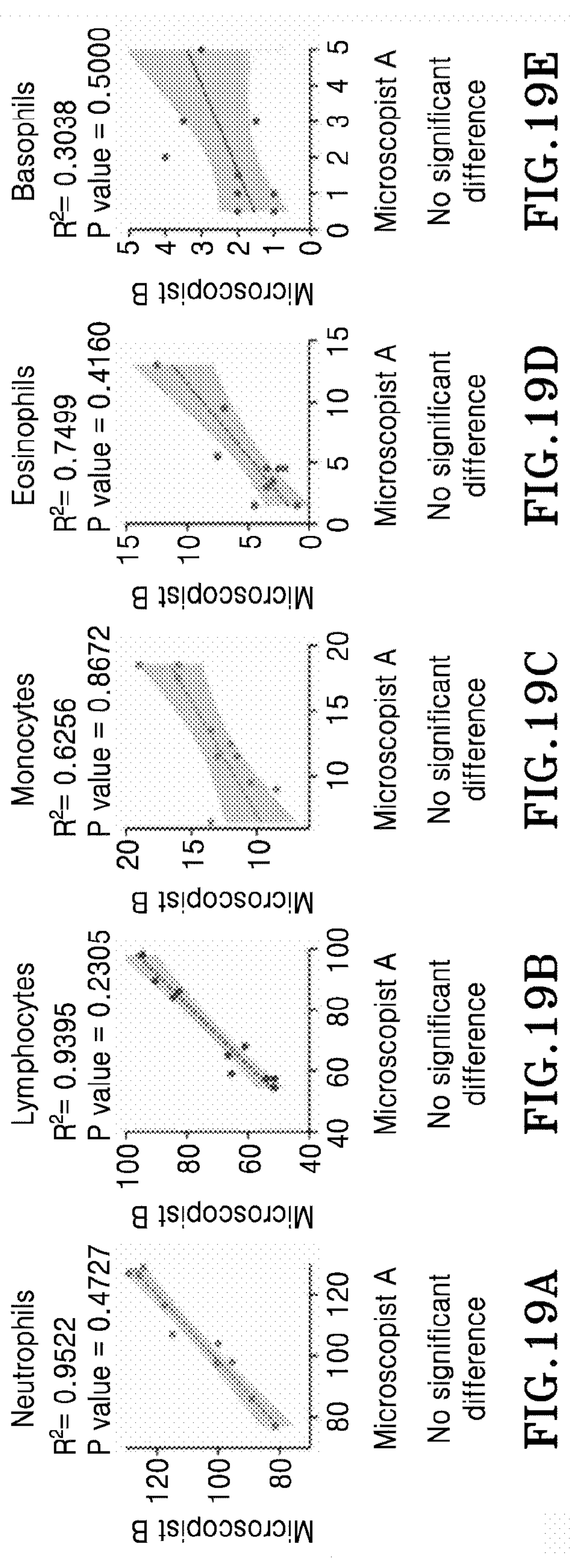
FIG. 19A illustrates a graphical representation characterizing a sample containing neutrophils stained with an automated blood smear instrument.
FIG. 19B illustrates a graphical representation characterizing a sample containing lymphocytes stained with an automated blood smear instrument.
FIG. 19C illustrates a graphical representation characterizing a sample containing monocytes stained with an automated blood smear instrument.
FIG. 19D illustrates a graphical representation characterizing a sample containing eosinophils stained with an automated blood smear instrument.
FIG. 19E illustrates a graphical representation characterizing a sample containing basophils stained with an automated blood smear instrument.

FIGS. 18A-18E and FIGS. 19A-19E are a series of graphical representations characterizing the correlation comparison of white blood cell (WBC) analysis in ten patients between two microscopists. More specifically, FIGS. 18A-18E illustrate a series of graphical representations characterizing samples stained with hydrogel stamping. FIG. 18A illustrates a graphical representation characterizing a sample containing neutrophils stained with hydrogel stamping. FIG. 18B illustrates a graphical representation characterizing a sample containing lymphocytes with hydrogel stamping. FIG. 18C illustrates a graphical representation characterizing a sample containing monocytes with hydrogel stamping. FIG. 18D illustrates a graphical representation characterizing a sample containing eosinophils with hydrogel stamping. FIG. 18E illustrates a graphical representation characterizing a sample containing basophils with hydrogel stamping. FIGS. 19A-19E illustrates a series of graphical representations characterizing samples stained with an automated blood smear instrument. FIG. 19A illustrates a graphical representation characterizing a sample containing neutrophils stained with an automated blood smear instrument. FIG. 19B illustrates a graphical representation characterizing a sample containing lymphocytes stained with an automated blood smear instrument. FIG. 19C illustrates a graphical representation characterizing a sample containing monocytes stained with an automated blood smear instrument. FIG. 19D illustrates a graphical representation characterizing a sample containing eosinophils stained with an automated blood smear instrument. FIG. 19E illustrates a graphical representation characterizing a sample containing basophils stained with an automated blood smear instrument. Hydrogel-based staining under these conditions produced the optimal contrast and a blend of blue, red, and purple colors comparable to results obtained by the Wright-Giemsa staining.

Figures 20A, 20B, 20C, 20D, 20E:
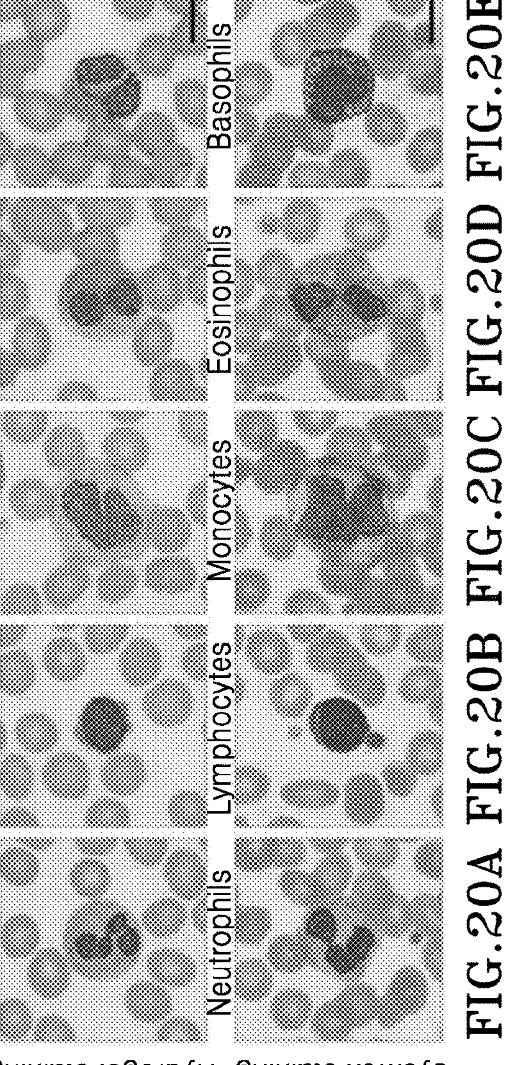
FIG. 20A illustrates a representative image of a sample containing neutrophils stained by hydrogel staining and the automated blood smear instrument.
FIG. 20B illustrates a representative image of a sample containing lymphocytes stained by hydrogel staining and the automated blood smear instrument.
FIG. 20C illustrates a representative image of a sample containing monocytes stained by hydrogel staining and the automated blood smear instrument.
FIG. 20D illustrates a representative image of a sample containing eosinophils stained by hydrogel staining and the automated blood smear instrument.
FIG. 20E illustrates a representative image of a sample containing basophils stained by hydrogel staining and the automated blood smear instrument.
Figures 21A, 21B, 21C, 21D, 21E:
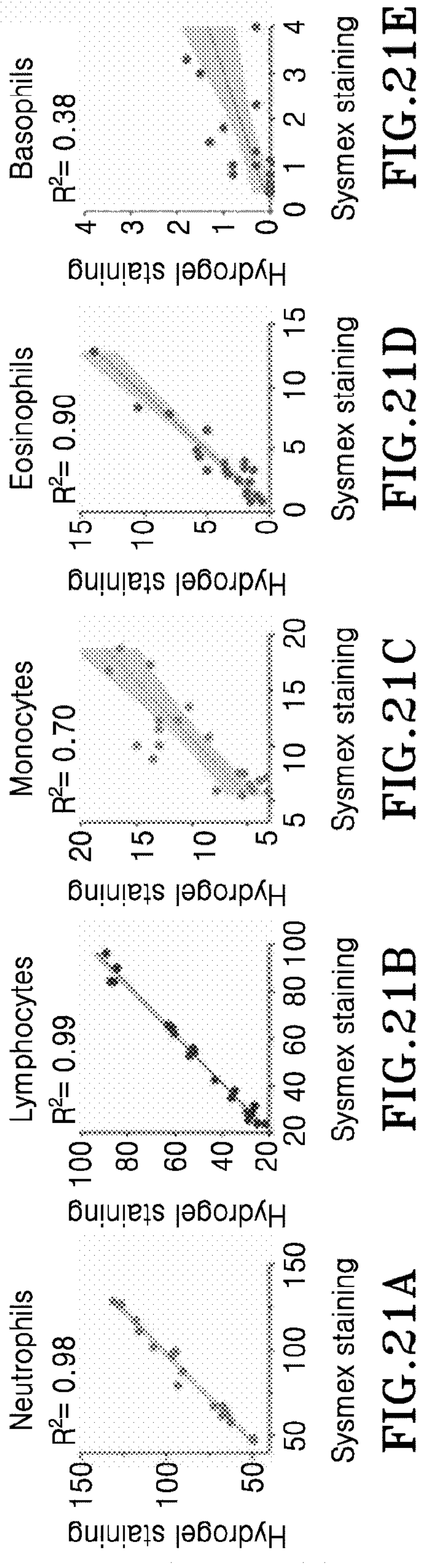
FIG. 21A illustrates a graphical representation of a correlation for WBCs obtained with the two methods for a sample containing neutrophils, having a linear regression, $R^2$, of approximately 0.98.
FIG. 21B illustrates a graphical representation of a correlation for WBCs obtained with the two methods for a sample containing lymphocytes, having a linear regression, $R^2$, of approximately 0.99.
FIG. 21C illustrates a graphical representation of a correlation for WBCs obtained with the two methods for a sample containing monocytes, having a linear regression, $R^2$, of approximately 0.70.
FIG. 21D illustrates a graphical representation of a correlation for WBCs obtained with the two methods for a sample containing eosinophils, having a linear regression, $R^2$, of approximately 0.90.
FIG. 21E illustrates a graphical representation of a correlation for WBCs obtained with the two methods for a sample containing basophils, having a linear regression, $R^2$, of approximately 0.38.

The hydrogel staining method can also be used on blood smears from healthy donors and compared with the staining quality to other staining methods. FIGS. 20A-20E and FIGS. 21A-21E illustrates comparisons of hydrogel staining with automated blood smear instrument staining for WBCs. FIG. 20A illustrates a representative image of a sample containing neutrophils stained by hydrogel staining and the automated blood smear instrument. FIG. 20B illustrates a representative image of a sample containing lymphocytes stained by hydrogel staining and the automated blood smear instrument. FIG. 20C illustrates a representative image of a sample containing monocytes stained by hydrogel staining and the automated blood smear instrument. FIG. 20D illustrates a representative image of a sample containing eosinophils stained by hydrogel staining and the automated blood smear instrument. FIG. 20E illustrates a representative image of a sample containing basophils stained by hydrogel staining and the automated blood smear instrument. The scale bar for FIGS. 20A-20E is approximately 10 μm. FIGS. 21A-21E illustrates graphical representations of correlations of WBC counts from approximately 20 patient samples prepared by hydrogel and the automated blood smear instrument. FIG. 21A illustrates a graphical representation of a correlation for WBCs obtained with the two methods for a sample containing neutrophils, having a linear regression, $R^2$, of approximately 0.98. FIG. 21B illustrates a graphical representation of a correlation for WBCs obtained with the two methods for a sample containing lymphocytes, having a linear regression, $R^2$, of approximately 0.99. FIG. 21C illustrates a graphical representation of a correlation for WBCs obtained with the two methods for a sample containing monocytes, having a linear regression, $R^2$, of approximately 0.70. FIG. 21D illustrates a graphical representation of a correlation for WBCs obtained with the two methods for a sample containing eosinophils, having a linear regression, $R^2$, of approximately 0.90. FIG. 21E illustrates a graphical representation of a correlation for WBCs obtained with the two methods for a sample containing basophils, having a linear regression, $R^2$, of approximately 0.38. However, the lower correlations for monocytes shown in FIG. 21C and basophil in FIG. 21E were also seen when comparing an automated blood smear instruments and manual microscopy ($R^2$=0.66 for monocytes and $R^2$=0.34 for basophils), likely due to small cell counts.

FIGS. 22-25 illustrate hematoxylin and eosin stain (H&E) by agarose hydrogel staining for Formalin-Fixed Paraffin-Embedded (FFPE) sections. More specifically, FIG. 22 illustrates H&E by agarose hydrogel staining by agarose hydrogel staining on liver FFPE sections. FIG. 23 illustrates H&E by agarose hydrogel staining by agarose hydrogel staining on breast FFPE sections. FIG. 24 illustrates H&E by agarose hydrogel staining by agarose hydrogel staining on kidney FFPE sections. FIG. 25 illustrates H&E by agarose hydrogel staining by agarose hydrogel staining on colon FFPE sections. The staining illustrated in FIGS. 22-25 was carried out first by hematoxylin hydrogel staining for approximately two minutes, bluing by pH 8.0 buffer hydrogel stamping for approximately ten seconds, and eosin Y hydrogel staining for approximately thirty seconds.

Figures 26A, 26B:
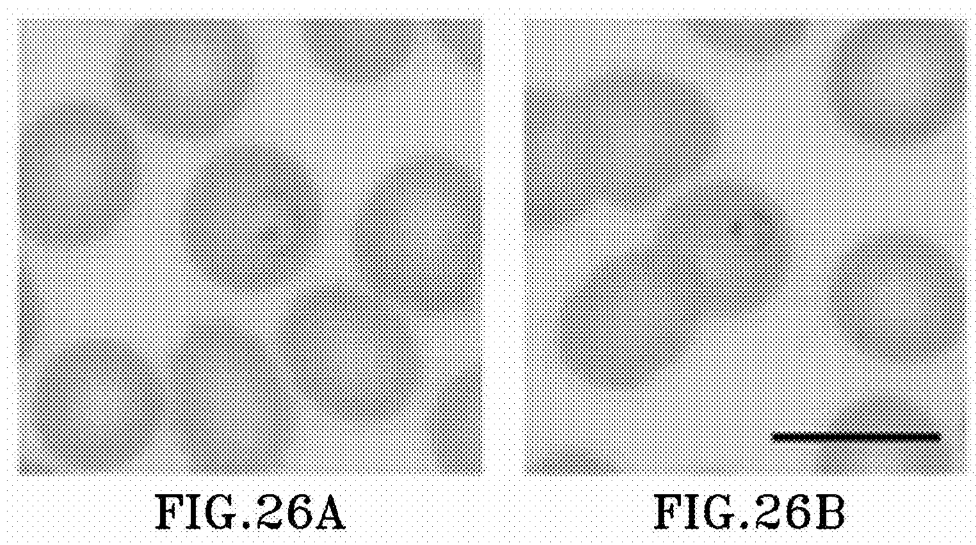
FIG. 26A illustrates an image stained by hydrogel staining.
FIG. 26B illustrates an image stained using Giemsa staining.
Figure 27:
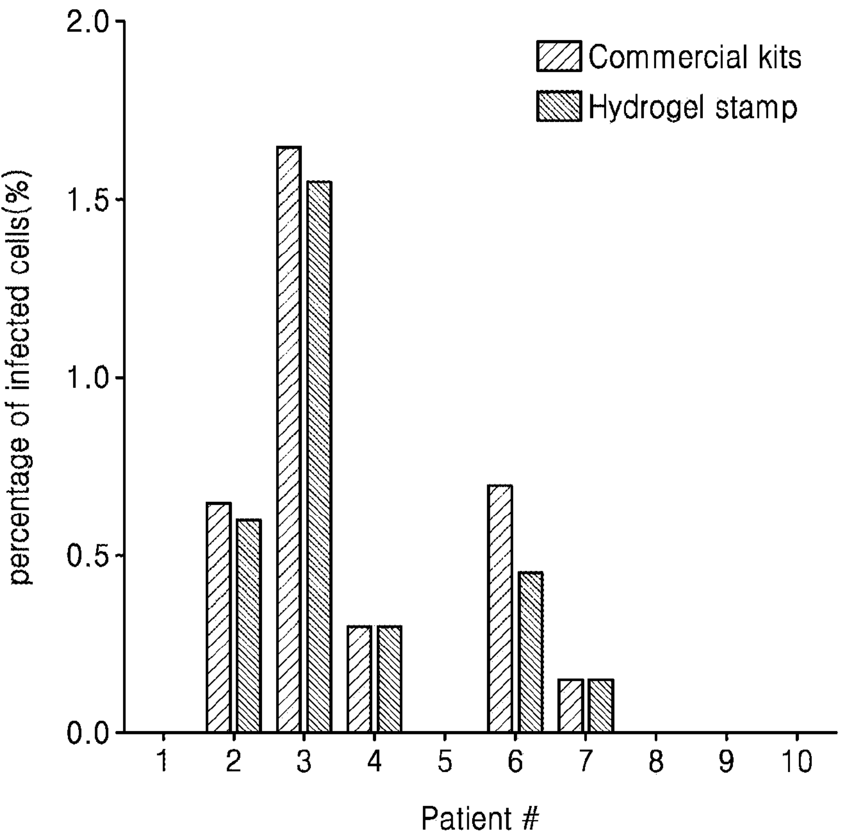
FIG. 27 is a graphical representation illustrating the number of infected cells detected in patient samples using Wright-Giemsa staining (e.g., blue bars) and hydrogel staining (e.g., red bars).

FIGS. 26A-27 characterize hydrogel staining of malaria-infected red blood cells (RBCs). Malaria is a major threat to public health, particularly in tropical regions. Malaria-infected RBCs can be detected by the unique and characteristic ring forms of parasites inside RBCs. FIGS. 26A-26B illustrate representative images of malaria-infected RBCs. The scale bar is approximately 10 μm. FIG. 26A illustrates an image stained by hydrogel staining. FIG. 26B illustrates an image stained using Giemsa staining. In samples from malaria-infected patients, parasites' ring forms in malaria-infected RBCs are clearly visible after hydrogel staining image of FIG. 26A. The hydrogel staining performance is comparable to Wright-Giemsa staining shown in image of FIG. 26B. FIG. 27 is a graphical representation illustrating the number of infected cells detected in patient samples using Wright-Giemsa staining (e.g., blue bars) and hydrogel staining (e.g., red bars). On average, among 2000 RBCs analyzed, approximately 0.2~1.7% of RBCs were found infected in the positive samples. There is no significant difference between the slides prepared by hydrogel staining and the Wright-Giemsa method (t-test, p=0.07-1.00). For malaria detection, the staining time for the hydrogel stamp containing eosin is approximately 10 seconds and for the hydrogel stamp containing methylene blue is approximately 60 seconds.

The standard Wright-Giemsa staining protocol was established about 110 years ago. Despite its long history and widespread use, variability in staining of blood smears often becomes an issue for accurate diagnosis of blood-borne diseases (e.g., malaria), which usually requires a skilled and experienced technician. Hydrogel-based staining method improves the robustness and quality of blood staining in resource-limited settings. Hydrogel staining deploys at least three agarose gels with pre-embedded reagents. High-quality staining can be achieved by sequentially placing these gels in contact with the blood smear. Staining can be completed in less than four minutes and does not require additional equipment or reagents. The hydrogel staining thus saves significant amounts of reagents and reduces biological waste.

FIG. 28 is a table comparing staining protocols and reagent use (per test) for hydrogel staining and a commercial Wright-Giemsa staining kit. Commercial kits for Wright-Giemsa staining can help to reduce the volumes of liquid waste, but still can require up to twenty-five times more liquid volume than hydrogel stamping staining.

Figure 29:
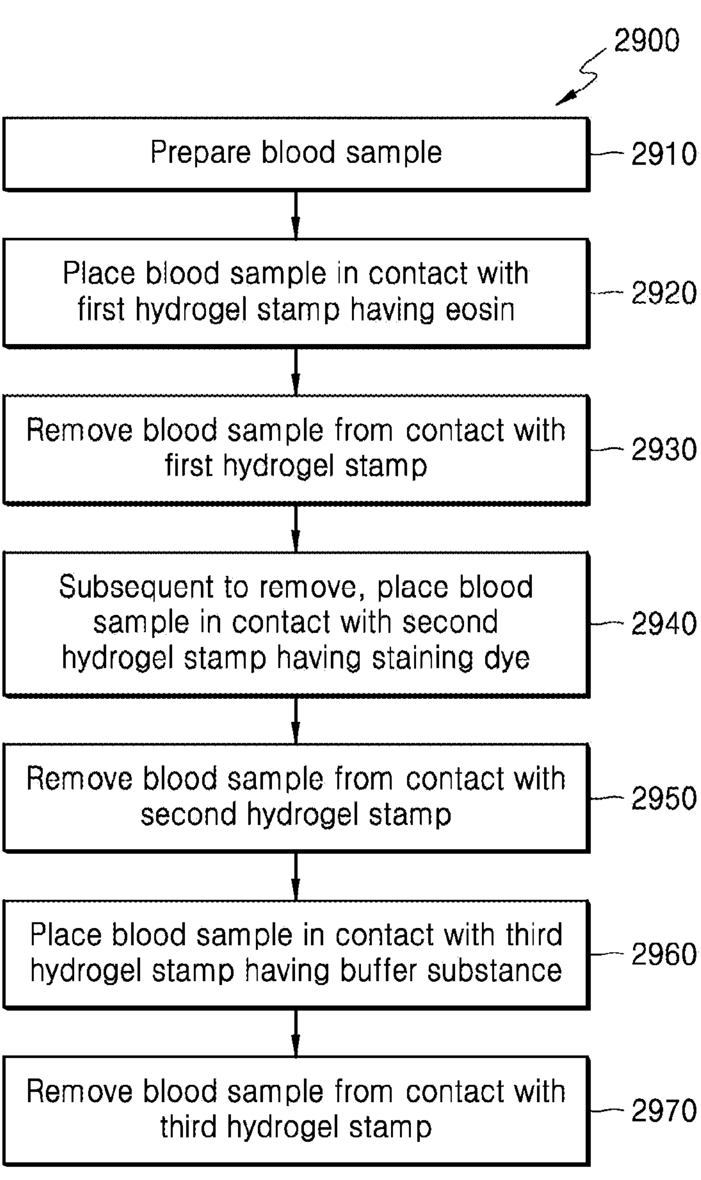
FIG. 29 is a flow chart illustrating a method of hydrogel blood staining.

FIG. 29 is a flow chart 2900 illustrating a method of hydrogel blood staining. A blood sample is prepared, at 2910. For example, the blood sample can be smeared and dried as a thin film using methanol fixation for approximately 7 minutes. The blood sample is placed, at 2920, in contact with a first hydrogel stamp having eosin to facilitate diffusion out of the hydrogel stamp to stain the blood sample. More specifically, the first hydrogel stamp contains anionic acidic eosin dyes (e.g., as shown in FIG. 1). Acidic eosin dyes bind to basic cellular components (e.g., proteins) and stain erythrocytes and eosinophil granules pink. While the blood sample is in contact with the hydrogel stamp containing eosin, it is incubated for approximately 10 seconds to 60 seconds (e.g., optimally 30 seconds for most blood samples, 10 seconds for blood samples containing malaria). Direct contact of the agarose hydrogel with the blood sample results in the transfer of dyes onto blood cells and stains them (e.g., as shown in FIGS. 4A-4I). The blood sample is subsequently removed, at 2930, from contact with the first hydrogel stamp. Subsequent to the removing, the blood sample is placed, at 2940, in contact with a second hydrogel stamp having a staining dye to facilitate diffusion out of the hydrogel stamp to stain the blood sample. The second hydrogel stamp contains cationic basic methylene blue with oxidized methylene blue/Azure B (e.g., as shown in FIG. 1). Basic methylene blue/Azure B bind to more acidic cellular components (e.g., chromatin) and stains leukocyte nuclei, cell granules, and lymphocyte cytoplasm blue. While the blood sample is in contact with the hydrogel stamp containing the staining dye, it is incubated for approximately 10 seconds to 30 seconds (e.g., optimally 10 seconds for most blood samples, 60 seconds for blood samples containing malaria). The blood sample is then removed, at 2950, from contact with the second hydrogel stamp. The blood sample is placed, at 2960, in contact with a third hydrogel stamp comprising a buffer substance to absorb excessive unbound or weakly-bounded dye from the blood sample. While the blood sample is in contact with the hydrogel stamp containing the buffer, it is incubated for approximately 30 seconds to 180 seconds (e.g., optimally 180 seconds for most blood samples). The third hydrogel stamp is removed, at 2970, from the blood sample. No additional washing steps are required after the removal of the third hydrogel stamp from the blood sample.

In hydrogel staining, direct contact of hydrogels to a thin blood cell film transfer dyes to blood cells on a slide. The charged dyes dissolved in water are weakly contained in the uncharged hydrogel matrix. When the hydrogel is contact with blood cells, dyes diffuse out of the hydrogel and stain blood cells. After eosin and methylene blue staining, the buffer hydrogel absorbs excessive unbound or weakly-bound dyes from stained blood cells. The staining time and buffer pH determine the contrast and color tones of cell staining.

The mechanical properties according to water content ratio can affect the quality of both stain and production. If the water content ratio is too high, it can be difficult for the production of hydrogel patches and handling of the staining. On the contrary, if the water content ratio is too low, the stain was weak, and the gel can dry too fast. Considering the quality of both stain and production, approximately 1.5-2.5% agarose gels have a proper mechanical hardness (e.g., approximately 100-250 g) for solid hydrogel staining. In some variations, the hydrogel gel stamp includes approximately 2.0% (e.g., 190 g) of agarose hydrogel.

FIG. 30 is a table illustrating hydrogel hardness measured with and without dyes with various agarose concentrations.

Figures 31A, 31B, 31C, 31D, 31E:
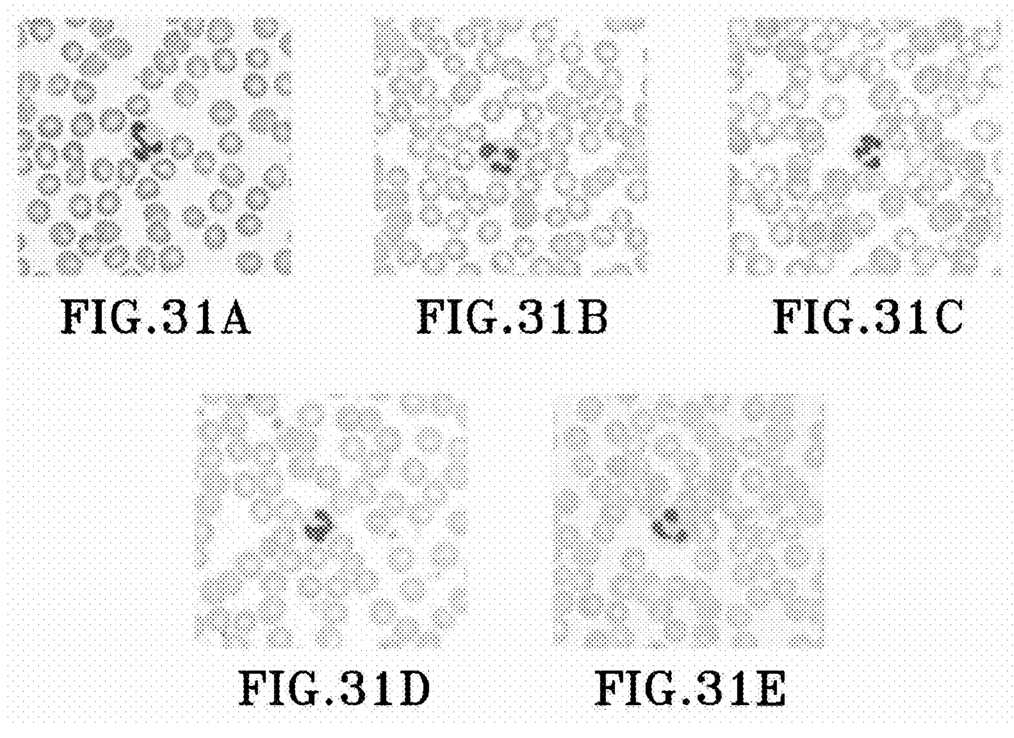
FIG. 31A is an image illustrating blood cells stained by hydrogels with an agarose concentration of approximately 0.5%.
FIG. 31B is an image illustrating blood cells stained by hydrogels with an agarose concentration of approximately 1.0%.
FIG. 31C is an image illustrating blood cells stained by hydrogels with an agarose concentration of approximately 2.0%.
FIG. 31D is an image illustrating blood cells stained by hydrogels with an agarose concentration of approximately 3.0%.
FIG. 31E is an image illustrating blood cells stained by hydrogels with an agarose concentration of approximately 4.0%.

FIGS. 31A-31E is a series of images of blood cells stained by hydrogels made in different agarose concentrations from approximately 0.5% to approximately 4%. FIG. 31A is an image illustrating blood cells stained by hydrogels with an agarose concentration of approximately 0.5%. FIG. 31B is an image illustrating blood cells stained by hydrogels with an agarose concentration of approximately 1.0%. FIG. 31C is an image illustrating blood cells stained by hydrogels with an agarose concentration of approximately 2.0%. FIG. 31D is an image illustrating blood cells stained by hydrogels with an agarose concentration of approximately 3.0%. FIG. 31E is an image illustrating blood cells stained by hydrogels with an agarose concentration of approximately 4.0%. As illustrated in FIGS. 31A-31E, 2% of agarose concentration provides a hardness over 200 g, which facilitates easy handling and demonstrates optimal staining quality.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

Certain Embodiments

Certain embodiments of the present subject matter described above, may be beneficial alone or in combination, with one or more other embodiments recited hereinbelow. In addition, while the present subject matter has been disclosed with reference to certain embodiments recited below, and in the claims, numerous modifications, alterations, and changes to the described embodiments are possible without departing from the sphere and scope of the present disclosure. Accordingly, it is intended that the present disclosure not to be limited to the described embodiments, aspects, and claims, but that it has the full scope defined by the language of this disclosure and equivalents thereof. While the present technology has been described with reference to the specific embodiments thereof, it should be understood by those skilled in the art that various changes may be made and equivalents may be substituted without departing from the true spirit and scope of the disclosure. In addition, many modifications may be made to adapt a particular situation, material, composition of matter, process, and/or process step or steps, to the objective, spirit and scope of the present disclosure. All such modifications are intended to be within the scope of the claims appended hereto.

1. A method of hydrogel stamping for blood sample staining, the method comprising:
   preparing a blood sample;
   placing the blood sample in contact with a first hydrogel stamp comprising a first staining dye to facilitate diffusion out of the hydrogel stamp to stain the blood sample by the first staining dye;
   removing the blood sample from contact with the first hydrogel stamp;
   placing the blood sample in contact with a second hydrogel stamp comprising a second staining dye to facilitate diffusion out of the hydrogel stamp to stain the blood sample by the second staining dye;
   removing the blood sample from contact with the second hydrogel stamp;
   placing the blood sample in contact with a third hydrogel stamp comprising a buffer substance to absorb excessive unbound or weakly-bound staining dye from the blood sample; and
   removing the third hydrogel stamp from the blood sample,
   wherein no intermediate washing step is performed after staining by the first staining dye or staining by the second staining dye.
2. The method of the preceding embodiment, wherein the blood sample is prepared through smearing.
3. The method of any preceding embodiment, wherein the blood sample is dried with methanol fixation.
4. The method of any preceding embodiment, wherein the first staining dye comprises eosin and the second staining dye comprises at least one of methylene blue or Azure B.
5. The method of any preceding embodiment, wherein the first staining dye comprises at least one of methylene blue or Azure B and the second staining dye comprises eosin.
6. The method of any preceding embodiment, wherein each of the first, second, and third hydrogel stamps comprises at least one of agarose, polyacrylamide, alginate, or polyaniline.
7. The method of embodiment 6, wherein each of the first, second, and third hydrogel stamps comprises agarose.
8. The method of embodiment 7, wherein the agarose is uncharged.
9. The method of embodiment 7, wherein the agarose forms nanometer-scale channels.
10. The method of any preceding embodiment, wherein the blood sample comprises white blood cell and/or red blood cell.
11. The method of embodiment 10, wherein the white blood cell comprises at least one of neutrophils, lymphocytes, monocytes, eosinophils, or basophils.
12. The method of embodiment 10, wherein the red blood cell comprises malaria.
13. The method of any preceding embodiment, wherein each of the first and second hydrogel stamp is in contact with the blood sample for less than one minute.
14. The method of any preceding embodiment, wherein the entire staining procedure is completed in less than five minutes, such as about one, two, three, or four minutes.
15. The method of embodiment 4, wherein the first hydrogel stamp is in contact with the blood sample between about 10 seconds and about 60 seconds, such as about 10, 20, 30, 40, 50, or 60 seconds.

16. The method of embodiment 15, wherein the first hydrogel stamp is in contact with the blood sample about 30 seconds, such as about 10, 15, 20, 25 or 30 seconds.
17. The method of embodiment 4, wherein the second hydrogel stamp is in contact with the blood sample between about 10 seconds and about 30 seconds, such as about 10, 15, 20, 25, or 30 seconds.
18. The method of embodiment 17, wherein the second hydrogel stamp is in contact with the blood sample about 10 seconds, such as about 2, 4, 6, 8, or 10 seconds.
19. The method of embodiment 4, wherein the third hydrogel stamp is in contact with the blood sample between about 30 seconds and about 180 seconds, such as about 30, 40, 50, 60, 70, 80, 90, 100, 110, 120, 130, 140, 150, 160, or 170 seconds.
20. The method of embodiment 19, wherein the third hydrogel stamp is in contact with the blood sample about 180 seconds.
21. The method of embodiment 12, wherein the first hydrogel stamp is in contact with the blood sample comprising malaria for about 10 seconds and the second hydrogel stamp is in contact with the blood sample comprising malaria for about 60 seconds.
22. The method of any preceding embodiment, wherein the pH of the buffer substance is at least one of about 6.4, about 6.6, about 6.8, about 7.0, about 7.2, or about 7.4.
23. The method of any preceding embodiment, wherein the pH of the buffer substance is about 6.8.
24. The method of any preceding embodiment, wherein the blood sample comprises a Formalin-Fixed Paraffin-Embedded (FFPE) sections.
25. The method of embodiment 20, wherein the FFPE sections comprise at least one of liver cells, breast cells, kidney cells, colon cells, pancreatic cells, ovarian cell, or skin cells.
26. The method of any preceding embodiment, wherein each of the first hydrogel stamp, the second hydrogel stamp, and the third hydrogel stamp comprise about 1 mL of a reagent, such as about 1.0, 0.8, 0.7, 0.6, 0.5, 0.4, or 0.3 mL of a reagent.
27. The method of any preceding embodiment, wherein at least one of the staining dyes comprises hematoxylin staining dye.
28. The method of any preceding embodiment, wherein at least one of the staining dyes comprises Papanicolaou staining dye.
29. The method of any preceding embodiment, wherein at least one of the staining dyes comprises gram staining dye.
30. The method of embodiment 7, wherein the concentration of the agarose is between about 0.4% and about 5.0%, such as about 0.5%, 0.6%, 0.7%, 0.8%, 0.9%, 1.0%, 1.2%, 1.4%, 1.5%, 1.6%, 1.8%, 2.1%, 2.3%, 2.5%, 2.8%, 3.0%, 3.3%, 3.5%, 3.7%, 4.0%, 4.2%, 4.5%, 4.8%, or 5.0%.
31. The method of embodiment 30, wherein the concentration of the agarose is between about 1.5% and about 2.5%.
32. The method of embodiment 31, wherein the concentration of the agarose is about 2.0%.
33. The method of embodiment 7, wherein the mechanical hardness of the agarose is between about 100 g and about 350 g, such as about 150 g, 200 g, 250 g, or 350 g.
34. The method of embodiment 33, wherein the mechanical hardness of the agarose is between about 200 g and about 300 g.
35. The method of embodiment 34, wherein the mechanical hardness of the agarose is about 260 g.

What is claimed is:

1. A method of hydrogel stamping for blood sample staining, the method comprising:
- preparing a blood sample;
- placing the blood sample in contact with a first hydrogel stamp comprising a first staining dye to facilitate diffusion out of the hydrogel stamp to stain the blood sample by the first staining dye;
- removing the blood sample from contact with the first hydrogel stamp;
- placing the blood sample in contact with a second hydrogel stamp comprising a second staining dye to facilitate diffusion out of the hydrogel stamp to stain the blood sample by the second staining dye;
- removing the blood sample from contact with the second hydrogel stamp;
- placing the blood sample in contact with a third hydrogel stamp comprising a buffer substance to absorb excessive unbound or weakly-bound staining dye from the blood sample; and
- removing the third hydrogel stamp from the blood sample,
- wherein no intermediate washing step is performed after staining by the first staining dye or staining by the second staining dye,
- wherein the first staining dye comprises eosin and the second staining dye comprises at least one of methylene blue or Azure B,
- wherein the first hydrogel stamp is in contact with the blood sample for 30 seconds or more and less than 40 seconds, and
- wherein the second hydrogel stamp is in contact with the blood sample for 10 seconds or more and less than 20 seconds.

2. The method of claim 1, wherein the blood sample is prepared through smearing.

3. The method of claim 1, wherein the blood sample is dried with methanol fixation.

4. The method of claim 1, wherein each of the first, second, and third hydrogel stamps comprises at least one of agarose, polyacrylamide, alginate, or polyaniline.

5. The method of claim 4, wherein each of the first, second, and third hydrogel stamps comprises agarose.

6. The method of claim 5, wherein the agarose is uncharged.

7. The method of claim 5, wherein the agarose forms nanometer-scale channels.

8. The method of claim 5, wherein the concentration of the agarose is between about 0.5% and about 4.0%.

9. The method of claim 8, wherein the concentration of the agarose is between about 1.5% and about 2.5%.

10. The method of claim 9, wherein the concentration of the agarose is about 2.0%.

11. The method of claim 5, wherein the mechanical hardness of the agarose is between about 100 g and about 350 g.

12. The method of claim 11, wherein the mechanical hardness of the agarose is between about 200 g and about 300 g.

13. The method of claim 12, wherein the mechanical hardness of the agarose is about 260 g.

14. The method of claim 1, wherein the blood sample comprises white blood cell and/or red blood cell.

15. The method of claim 14, wherein the white blood cell comprises at least one of neutrophils, lymphocytes, monocytes, eosinophils, or basophils.

16. The method of claim 14, wherein the red blood cell comprises malaria.

17. The method of claim 1, wherein the entire staining procedure is completed in less than four minutes.

18. The method of claim 1, wherein the third hydrogel stamp is in contact with the blood sample between about 30 seconds and about 180 seconds.

19. The method of claim 18, wherein the third hydrogel stamp is in contact with the blood sample about 180 seconds.

20. The method of claim 1, wherein the pH of the buffer substance is at least one of about 6.4, about 6.8, or about 7.2.

21. The method of claim 1, wherein the pH of the buffer substance is about 6.8.

22. The method of claim 1, wherein the blood sample comprises a Formalin-Fixed Paraffin-Embedded (FFPE) sections.

23. The method of claim 22, wherein the FFPE sections comprise at least one of liver cells, breast cells, kidney cells, or colon cells.

24. The method of claim 1, wherein each of the first hydrogel stamp, the second hydrogel stamp, and the third hydrogel stamp comprise about 1 mL of a reagent.

25. The method of claim 1, wherein at least one of the staining dyes comprises hematoxylin staining dye.

26. The method of claim 1, wherein at least one of the staining dyes comprises Papanicolaou staining dye.

27. The method of claim 1, wherein at least one of the staining dyes comprises gram staining dye.

* * * * *